United States Patent
Fitzgerald et al.

(10) Patent No.: US 11,489,255 B2
(45) Date of Patent: Nov. 1, 2022

(54) PHASE SHIFTERS USING SWITCH-BASED FEED LINE SPLITTERS

(71) Applicant: Analog Devices International Unlimited Company, Limerick (IE)

(72) Inventors: Padraig Fitzgerald, Mallow (IE); Yong Zhang, Beijing (CN); Padraig McDaid, Limerick (IE); Dragoslav Culum, Ottawa (CA); Philip Brennan, Limerick (IE); Derek Nolan, Tralee (IE)

(73) Assignee: ANALOG DEVICES INTERNATIONAL UNLIMITED COMPANY, Limerick (IE)

(*) Notice: Subject to any disclaimer, the term of this patent is extended or adjusted under 35 U.S.C. 154(b) by 191 days.

(21) Appl. No.: 16/869,827

(22) Filed: May 8, 2020

(65) Prior Publication Data

US 2020/0411984 A1    Dec. 31, 2020

(30) Foreign Application Priority Data

Jun. 26, 2019    (WO) ................ PCT/CN2019/093016

(51) Int. Cl.
*H01Q 3/00* (2006.01)
*H01Q 3/42* (2006.01)
(Continued)

(52) U.S. Cl.
CPC ............... *H01Q 3/42* (2013.01); *H01Q 3/38* (2013.01); *H01Q 3/36* (2013.01); *H04B 7/0671* (2013.01)

(58) Field of Classification Search
CPC ... H01Q 3/42; H01Q 3/38; H01Q 3/36; H04B 7/0671
(Continued)

(56) References Cited

U.S. PATENT DOCUMENTS 4,599,585 A     7/1986   Vorhaus et al.
6,492,943 B1 *  12/2002  Marumoto ............. H01Q 3/385
                                                              342/372
(Continued)

FOREIGN PATENT DOCUMENTS

EP       1898523        3/2008
EP       3386029        10/2018
WO       2016150483     9/2016

OTHER PUBLICATIONS

Chakraborty et al., *Paradigm Phase Shift: RF MEMS Phase Shifters: An Overview*, IEEE Microwave Magazine, Jan. 2017, 21 pages.
(Continued)

*Primary Examiner* — Chuong P Nguyen
(74) *Attorney, Agent, or Firm* — Akona IP PC

(57) ABSTRACT

A phase shifter that includes an RF splitter is disclosed. The RF splitter is arranged so that an RF input signal is provided to, and split over portions of, a feed line that connects an antenna element with a radio transmitter/receiver/transceiver, thus realizing a feed line splitter. Feed line splitters described herein are provided with switches that allow changing a point at which the RF input signal is fed to the feed line, where the switches may be semiconductor-based or MEMS-based switches. The point at which the RF input signal is provided to the feed line to be split defines the electrical path length that the RF energy will travel down each respective path of the feed line splitter, which, in turn, changes the phase shift realized at each output of the feed line splitter. Different antenna elements may be coupled to different outputs of the feed line splitter.

20 Claims, 19 Drawing Sheets

(51) Int. Cl.
*H01Q 3/38* (2006.01)
*H04B 7/06* (2006.01)
*H01Q 3/36* (2006.01)

(58) Field of Classification Search
USPC .................................................. 342/368, 374
See application file for complete search history.

(56) References Cited

U.S. PATENT DOCUMENTS

| | | | |
|---|---|---|---|
| 6,642,908 B2 | 11/2003 | Pleva et al. | |
| 6,816,116 B2 | 11/2004 | Chen | |
| 7,595,753 B2 | 9/2009 | Ratni | |
| 7,728,701 B2 | 6/2010 | Lin et al. | |
| 7,911,383 B2 | 3/2011 | Haskell | |
| 7,965,235 B2 * | 6/2011 | Quan | H01Q 3/26 342/372 |
| 9,184,498 B2 | 11/2015 | Schiller | |
| 9,419,833 B2 * | 8/2016 | Wang | H04L 27/18 |
| 9,780,448 B1 | 10/2017 | Meagher et al. | |
| 9,871,293 B2 * | 1/2018 | Patel | H01Q 13/28 |
| 10,958,322 B2 * | 3/2021 | Wang | H04B 7/0602 |
| 11,063,352 B2 | 7/2021 | Cercelaru et al. | |
| 2008/0150800 A1 * | 6/2008 | Tsuji | H01Q 25/00 342/368 |
| 2008/0188229 A1 | 8/2008 | Melis et al. | |
| 2015/0214615 A1 * | 7/2015 | Patel | H01Q 3/443 342/372 |
| 2016/0006241 A1 | 1/2016 | Fitzgerald | |
| 2020/0161760 A1 * | 5/2020 | Domino | H01P 1/18 |
| 2020/0264490 A1 | 8/2020 | Zhu et al. | |
| 2021/0367339 A1 * | 11/2021 | Fitzgerald | H01Q 21/0006 |
| 2021/0391654 A1 * | 12/2021 | Takeda | H01Q 21/0075 |

OTHER PUBLICATIONS

Rebeiz, *RF MEMS Switches: Status of the Technology*, 0-7803-7731-1/03 © 2003 IEEE, 4 pages.
Lahiri et al., *RF MEMS Switch: An Overview At-A-Glance*, 2009 International Conference on Computers and Devices for Communication © 2009 CODEC, 5 pages.
Nasserddine, *Millimeter-Wave Phase Shifters Based on Tunable Transmission Lines in MEMS Technology Post-CMOS Process*, HAL, Jun. 5, 2018, 128 pages.
McFeetors et al., *Distributed MEMS Analog Phase Shifter with Enhanced Tuning*, IEEE Microwave and Wireless Components Letters, vol. 16, No. 1, Jan. 2006, 3 pages.
Nataraj et al., *Design of RF MEMS Phase Shifter Using Capacitive Shunt Switch*, International Journal of Pure and Applied Mathematics, vol. 119, No. 10, 2018, 14 pages.
Baghchehsaraei et al., *Waveguide-Integrated MEMS-Based Phase Shifter for Phased Array Antenna*, Propagation, HAL, 2014, 8 (4), 20 pages.
EP Office Action dated Nov. 18, 2020 in Application No. EP20181923.2, 10 pages.

* cited by examiner

PHASE SHIFTERS USING SWITCH-BASED FEED LINE SPLITTERS

CROSS REFERENCE TO RELATED APPLICATIONS

This application is related to PCT Application No. PCT/CN2019/093016, filed Jun. 26, 2019, titled "PHASE SHIFTERS USING SWITCH-BASED FEED LINE SPLITTERS," the disclosure of which is hereby incorporated by reference herein in its entirety.

TECHNICAL FIELD OF THE DISCLOSURE

The present disclosure generally relates to radio frequency (RF) systems and, more particularly, to phase shifters used in such systems.

BACKGROUND

Radio systems are systems that transmit and receive signals in the form of electromagnetic waves in the RF range of approximately 3 kilohertz (kHz) to 300 gigahertz (GHz). Radio systems are commonly used for wireless communications, with cellular/wireless mobile technology being a prominent example.

A phase shifter is an RF network module which provides a controllable phase shift of an RF signal. Phase shifters may be used in phased arrays, where, in antenna theory, a phased array usually refers to an electronically scanned array of antenna elements which creates a beam of radio waves that can be electronically steered to point in different directions without moving the antennas. In an array antenna, the RF current from the transmitter is fed to the individual antennas with the correct phase relationship so that the radio waves from the separate antennas add together to increase the radiation in a desired direction, while cancelling to suppress radiation in undesired directions. In a phased array, the power from the transmitter is fed to the antennas through phase shifters, controlled by a computer system, which can alter the phase electronically, thus steering the beam of radio waves to a different direction.

A variety of factors can affect the cost, quality and robustness of a phase shifter included in an RF system. Physical limitations such as space/surface area, as well as limitations that may be imposed by regulations, can pose further constraints to the requirements or specifications of a phase shifter, and, thus, trade-off and ingenuity have to be exercised in designing a phase shifter.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DESCRIPTION OF EXAMPLE EMBODIMENTS OF THE DISCLOSURE

Overview

Figure 1:
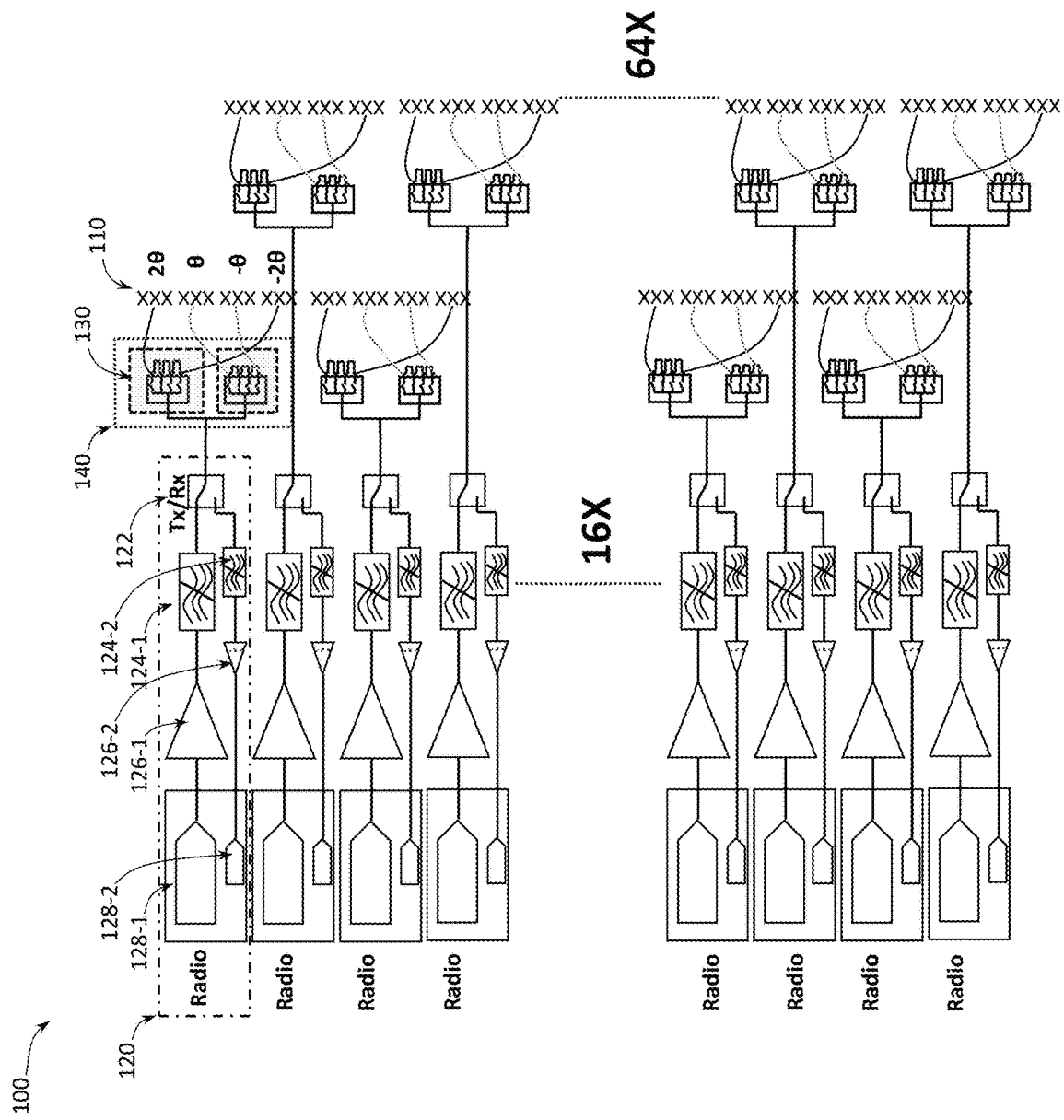
FIG. 1 provides a schematic illustration of an antenna apparatus with phase shifters using switch-based feed line splitters, according to some embodiments of the present disclosure.

The systems, methods and devices of this disclosure each have several innovative aspects, no single one of which is solely responsible for all desirable attributes disclosed herein. Details of one or more implementations of the subject matter described in this specification are set forth in the description below and the accompanying drawings.

For purposes of illustrating phase shifters with switch-based feed line splitters in RF systems, proposed herein, it might be useful to first understand phenomena that may come into play in such systems. The following foundational information may be viewed as a basis from which the present disclosure may be properly explained. Such information is offered for purposes of explanation only and, accordingly, should not be construed in any way to limit the broad scope of the present disclosure and its potential applications.

In context of radio systems, an antenna is a device that serves as an interface between radio waves propagating wirelessly through space and electric currents moving in metal conductors used with a transmitter or a receiver. During transmission, a radio transmitter may supply an electric current to antenna's terminals, and the antenna may radiate the energy from the current as radio waves. During reception, an antenna may intercept some of the power of a wireless radio wave in order to produce an electric current at its terminals, which current may subsequently be amplified by the receiver. Antennas are essential components of all radio equipment, and are used in radio broadcasting, broadcast television, two-way radio, communications receivers, radar, cell phones, satellite communications and other devices.

An antenna with a single antenna element will typically broadcast a radiation pattern that radiates equally in all directions in a spherical wavefront. Phased antenna arrays (also commonly referred to as "phase arrays") generally refer to a collection of antennas (where individual antennas are commonly referred to as "antenna elements") that are used to focus electromagnetic energy in a particular direction, thereby creating a main beam. Phased arrays offer numerous advantages over single-antenna systems, such as high gain, ability to perform directional steering, and simultaneous communication. Therefore, phased arrays are being used more frequently in a myriad of different applications, such as in mobile technology, cellular telephone and data, Wi-Fi technology, automotive radars, and airplane radars.

Each individual antenna element of a phased array may radiate in a spherical pattern, but, collectively, a plurality of such antenna elements may generate a wavefront in a particular direction (such a wavefront commonly referred to as a "main beam") through constructive and destructive interference. Namely, by carefully controlling the phase of signals radiated by different antenna elements, radiation patterns of different antenna elements may constructively interfere in a desired direction, creating the main beam in that direction, while interfering destructively in several other directions other than the direction of the main beam. Therefore, a phased array typically includes phase shift modules (also commonly referred to as "phase shifters"), configured to control the phase of signals radiated by different antenna elements.

In some conventional implementations, phase shifting is done in a transceiver, where the term "transceiver" may refer to all circuitry leading up to the antenna elements and may include up/down conversion (UDC) circuits (e.g., a frequency mixer configured to perform upconversion, in the transmit (TX) path, to RF signals for wireless transmission and/or a frequency mixer configured to perform downconversion, in the receive (RX) path, of received RF signals), amplifiers (e.g., power amplifiers (PAs) that may be included in the TX path and/or low-noise amplifiers (LNA) included in the RX path). The term "transceiver" may also refer to other circuitry such as filters, analog-to-digital converters (ADCs), digital-to-analog converters (DACs), transformers, and other circuit elements typically used in association with associated with UDC circuits, amplifiers, and RX/TX paths of an antenna apparatus. When phase shifting is done in a transceiver, typically a single transceiver is driving a single antenna element of an antenna array (e.g., 64 transceivers may be used to drive 64 antenna elements). While such an implementation may realize phase shifting quite effectively, for some applications, using so many transceivers may be prohibitively expensive in terms of component costs, die area, and power consumption.

In other conventional implementations, phase shifting is done closer to the antenna elements, as compared to phase shifting done in a transceiver, using mechanical phase shifters. Such mechanical phase shifters typically include an arm, or some other mechanical component, that is used to couple the RF input signal to various electrical paths, which enables realizing phase shifting. Oftentimes, such mechanical phase shifters are prohibitively large, possibly unreliable, and difficult to manufacture and customize to a given application. As antenna systems move to massive multiple input multiple output (MIMO) architecture, a lot more antenna elements, and a lot more electronics, space is becoming a premium in an antenna apparatus, and large mechanical components such as mechanical phase shifters use a lot of this valuable space. In addition, mechanical phase shifters may be slow in realizing the desired phase shifts.

Various embodiments of the present disclosure provide systems and methods that aim to improve on one or more challenges described above in enabling phase shifting in antenna arrays, such as, but not limited to, phased antenna arrays of fifth generation cellular (5G) or millimeter wave technology.

In one aspect of the present disclosure, an example phase shifter (also referred to herein as a "phase shift module") includes an RF splitter, where the term "RE splitter" refers to a transmission component which divides the power of an RF input signal (RFin) between two or more output ports. The RF splitter is arranged so that the RF input signal is provided over a first feed line and is split to RF signals in two or more other feed lines, thus realizing a "feed line splitter." As used herein, the term "feed line" (also sometimes referred to as a "feed line" or a "feeder") may refer to any portion of a cable or other transmission line that couples an antenna element with a radio transmitter, a radio receiver, or a transceiver (e.g., a wired communication medium/line over which an RF signal may be transmitted to or from the antenna element). During transmission (or, phrased differently, in a TX mode), a given feed line may be used to transmit an RF input signal (e.g., RF current) from a transmitter (or from a TX path of a transceiver) to at least one antenna element, where the RF signal is radiated (i.e., transmitted wirelessly) as radio waves. During receipt of RF waves (or, phrased differently, in a RX mode), a given feed line may be used to transfer an RF signal (e.g., RF voltage) induced in the antenna element by the received radio wave to a receiver (or to a RX path of a transceiver). In order to carry RF signals efficiently, a feed line may be made of a specialized type of cable typically referred to as a "transmission line," where some examples of transmission lines include coaxial cables, twin-leads, ladder lines, and microwave frequency waveguides (e.g., coplanar waveguides).

An example phase shifter may include a switch arrangement, configured to electrically couple a first feed line to a coupling point that is between two opposite ends of a second feed line so that a power of an RF signal transmitted over the first feed line includes (e.g., is) a sum of a power of an RF signal transmitted over a first portion of the second feed line and a power of an RF signal transmitted over a second portion of the second feed line. The first portion is a portion of the second feed line between the coupling point and the first end of the second feed line (where, in operation, a first antenna element is coupled to the first end of the second feed line). The second portion is a portion of the second feed line between the coupling point and the second end of the second feed line (where, in operation, a second antenna element is coupled to the second end of the second feed line). The switch arrangement may include a plurality of switches so that the switch arrangement may operate/be in one of a plurality of different states depending on a state of each switch of the plurality of switches, where the coupling point may be at a first location of a plurality of different, predefined locations between the two opposite ends of the second feed line when the switch arrangement is in its first state, and the coupling point is at a second location of the plurality of locations when the switch arrangement is in its second state of the plurality of states. Thus, the switch arrangement can allow varying a location of the coupling point depending on the configurations of the plurality of switches (e.g., depending on which switches are open and which switches are closed). In other words, the location of the coupling point is based on the state that the switch arrangement is in, which state depends on the configurations of the plurality of switches. Varying the location of the coupling point advantageously allows varying the phase shift that an RF signal undergoes when being transmitted over a given portion of the second feed line. In some embodiments, a plurality of such phase shifters may be included in a single antenna apparatus.

In particular, phase shifters described herein are based on several recognitions. One is that a respective (i.e., different) antenna element may be coupled to each end of the two or more split portions of a feed line. Another is that a phase shifter may be provided with a switch arrangement that includes a plurality of switches (hence, such phase shifters may be referred to as "switch-based") that allow changing the location of a point, referred to herein as a "coupling point," at which an RF signal in the first feed line is split into two RF signals transmitted over respective portions of the second feed line. The location of the coupling point defines the electrical path length that the RF energy travels down each respective portion of the second feed line, which, in turn, changes the phase shift realized at the output of that portion (hence, the switch-based feed line splitters described herein may be used to realize phase shifters). In various embodiments, various switches of the switch arrangements described herein may be realized as semiconductor-based switches (e.g., transistors, silicon-on-insulator (SOI) devices, PIN diodes, or other semiconductor-based switching elements) or microelectromechanical systems (MEMS)-based switches, or any mechanical switching element such as an electromagnetic relay. Yet another recognition on which the phase shifters described herein are based is that the switch arrangement and the coupling points along the second feed line may be arranged so that the phase shifts realized at the outputs at the two opposing ends of the second feed line may be complementary to one another, or differential. For example, an RF signal transmitted over the first portion of the second feed line may undergo a phase shift of $\theta$, while an RF signal transmitted over the second portion of the second feed line may undergo a phase shift of $-\theta$. For example, a phase shift realized by the first portion of the second feed line may be 35 degrees (°), while a phase shift realized by the second portion of the second feed line may be $-35°$.

Phase shifters using switch-based feed line splitters as described herein may provide various advantages. For example, coupling different antenna elements to different outputs of a feed line splitter advantageously allows operating two or more antenna elements (e.g., as many antenna elements as there are output paths over which the RF input signal is split) with a single transceiver. In another example, using a switch arrangement in coupling the RF input signal to the feed line splitter advantageously allows changing the point at which the RF input signal is split into two or more paths, which, in turn, allows changing the phase shifts at the outputs of the feed line splitter coupled to different antenna elements. In this manner, less transceivers may be used to operate (e.g., to drive, if in a transmission mode) a given number of antenna elements, compared to conventional implementations described above where phase shifting is done in a transceiver. For example, if a feed line splitter splits the RF input signal into 2 paths, and a switch arrangement coupling the split portion of the RF input signal to a respective feed line (thus, further performing RF splitting) is included at each path, then the RF input signal of a single transceiver may be used to provide phase-shifted RF portions to 4 different antenna elements (because each feed line has 2 ends/outputs, each end coupled to a different antenna elements, and there are 2 paths in which a respective feed line is provided, together with a respective switch). Therefore, in such an example, only 16 transceivers may be used to drive 64 antenna elements (because each transceiver may drive 4 antenna elements, and 4*16=64). Thus, various embodiments of phase shifters using switch-based feed line splitters described herein may provide significant improvements in terms of component costs, die area, and power consumption, compared to conventional implementations where phase shifting is done in a transceiver. On the other hand, various embodiments of phase shifters using switch-based feed line splitters described herein may also provide significant improvements over mechanical phase shifters described above, e.g., in terms of size, time to realize desired phase shifts, and ease of manufacture.

It should be noted that some descriptions of the phase shifters using switch-based feed line splitters are provided with respect to a TX path, or in a TX mode of operation of a transceiver and antenna elements. When a phase shifter operates in a TX mode, an RF input signal RFin is provided to the first feed line from a transceiver, and is subsequently split into two or more split portions in the second feed line, and portions of the RF signal RFin are provided at the multiple outputs of the phase shifter to the corresponding antenna elements to be wirelessly transmitted. However, these descriptions are equally applicable to when such phase shifters operate in an RX path, or in an RX mode of operation of the transceiver and antenna elements. When a phase shifter operates in an RX mode, antenna elements receive wireless RF signals and provide them as electric signals over the two or more portions of the second feed line to be combined into a single RF signal at the point where the second feed line is coupled to the first feed line. In this context, the phase shifts realized by different portions of the second feed line are analogous to those of the TX mode.

In some implementations, phase shifters as described herein may be used for performing phased array calibration to achieve phase synchronization (e.g., to compensate for, or reduce or eliminate, phase mismatch) between different UDC circuits used in 5G phased arrays. In various embodiments, the term "UDC circuit" may be used to include a frequency conversion circuit as such (e.g., a frequency mixer configured to perform upconversion to RF signals for wireless transmission, a frequency mixer configured to perform downconversion of received RF signals, or both), as well as any other components that may be included in a broader meaning of this term, such as filters, ADCs, DACs, transformers, and other circuit elements typically used in association with frequency mixers. In all of these variations, the term "UDC circuit" covers implementations where the UDC circuit only includes circuit elements related to a TX path (e.g., only an upconversion mixer but not a downconversion mixer; in such implementations the UDC circuit may be used as/in an RF transmitter for generating RF signals for transmission, e.g., the UDC circuit may enable a calibration probe or an antenna element of the antenna array that is connected to the UDC circuit to act, or be used, as a transmitter), implementations where the UDC circuit only includes circuit elements related to a RX path (e.g., only an downconversion mixer but not an upconversion mixer; in such implementations the UDC circuit may be used as/in an RF receiver to downconvert received RF signals, e.g., the UDC circuit may enable a calibration probe or an antenna element of the antenna array that is connected to the UDC circuit to act, or be used, as a receiver), as well as implementations where the UDC circuit includes, both, circuit elements of the TX path and circuit elements of the RX path (e.g., both the upconversion mixer and the downconversion mixer; in such implementations the UDC circuit may be used as/in an RF transceiver, e.g., the UDC circuit may enable a calibration probe or an antenna element of the antenna array that is connected to the UDC circuit to act, or be used, as a transceiver).

As will be appreciated by one skilled in the art, aspects of the present disclosure, in particular aspects of phase shifters using switch-based feed line splitters as described herein, may be embodied in various manners—e.g. as a method, a system, a computer program product, or a computer-readable storage medium. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Functions described in this disclosure may be implemented as an algorithm executed by one or more hardware processing units, e.g. one or more microprocessors, of one or more computers. In various embodiments, different steps and portions of the steps of any methods described herein may be performed by different processing units. Furthermore, aspects of the present disclosure may take the form of a computer program product embodied in one or more computer-readable medium(s), preferably non-transitory, having computer-readable program code embodied, e.g., stored, thereon. In various embodiments, such a computer program may, for example, be downloaded (updated) to the existing devices and systems (e.g. to the existing wireless communication transmitters, receivers, transceivers, phase shifters, and/or their controllers, etc.) or be stored upon manufacturing of these devices and systems.

The following detailed description presents various descriptions of specific certain embodiments. However, the innovations described herein can be embodied in a multitude of different ways, for example, as defined and covered by the claims or select examples. In the following description, reference is made to the drawings where like reference numerals can indicate identical or functionally similar elements. It will be understood that elements illustrated in the drawings are not necessarily drawn to scale. Moreover, it will be understood that certain embodiments can include more elements than illustrated in a drawing and/or a subset of the elements illustrated in a drawing. Further, some embodiments can incorporate any suitable combination of features from two or more drawings.

The description may use the phrases "in an embodiment" or "in embodiments," which may each refer to one or more of the same or different embodiments. Unless otherwise specified, the use of the ordinal adjectives "first," "second," and "third," etc., to describe a common object, merely indicate that different instances of like objects are being referred to, and are not intended to imply that the objects so described must be in a given sequence, either temporally, spatially, in ranking or in any other manner. Various aspects of the illustrative embodiments are described using terms commonly employed by those skilled in the art to convey the substance of their work to others skilled in the art. The terms "substantially," "approximately," "about," etc., may be used to generally refer to being within +/−20% of a target value based on the context of a particular value as described herein or as known in the art. For the purposes of the present disclosure, the phrase "A and/or B" or notation "A/B" means (A), (B), or (A and B). For the purposes of the present disclosure, the phrase "A, B, and/or C" means (A), (B), (C), (A and B), (A and C), (B and C), or (A, B, and C). The term "between," when used with reference to measurement ranges, is inclusive of the ends of the measurement ranges. As used herein, the notation "A/B/C" means (A, B, and/or C).

Various aspects of the illustrative embodiments are described using terms commonly employed by those skilled in the art to convey the substance of their work to others skilled in the art. For example, the term "connected" means a direct electrical connection between the things that are connected, without any intermediary devices/components, while the term "coupled" means either a direct electrical connection between the things that are connected, or an indirect electrical connection through one or more passive or active intermediary devices/components. In another example, the term "circuit" means one or more passive and/or active components that are arranged to cooperate with one another to provide a desired function. Sometimes, in the present descriptions, the term "circuit" may be omitted (e.g., a phase shifter circuit may be referred to simply as a "phase shifter," etc.). If used, the terms "substantially," "approximately," "about," etc., may be used to generally refer to being within +/−20% of a target value, e.g., within +/−10% of a target value, based on the context of a particular value as described herein or as known in the art.

Example Antenna Apparatus with Phase Shifters Using Switch-Based Feed Line Splitters FIG. 1 provides a schematic illustration of an antenna apparatus 100, e.g., a phased array system/apparatus, according to some embodiments of the present disclosure. As shown in FIG. 1, the system 100 may include an antenna array that includes a plurality of antenna elements 110, a plurality of transceivers 120, and a plurality of phase shifters 130.

Each of the phase shifters 130 may include components enclosed within a dashed contour shown in FIG. 1 for one of the phase shifters 130 (the one labeled with the reference numeral "130"). Any of the phase shifters 130 may be a switch-based feed line splitter as described herein, the details of which are provided below, e.g., with reference to FIG. 2 and subsequent figures. In some embodiments, two or more of such phase shifters 130 may be combined in a splitter 140, as shown in FIG. 1 with a plurality of splitters 140, each of which includes 2 phase shifters 130 (but, in general, the splitter 140 may include any one of more of the phase shifters 130). Each of the splitters 140 may include components enclosed within a dotted contour shown in FIG. 1 for one of the splitters 140 (the one labeled with the reference numeral "140").

Only one of the antenna elements 110, one of the transceivers 120, one of the phase shifters 130, and one of the splitters 140 are labeled with a reference numeral in FIG. 1 in order to not clutter the drawing. Example shown in FIG. 1 illustrates 64 antenna elements 110. In some embodiments, such antenna elements 110 may be arranged in columns, e.g., with each antenna column corresponding to a different one of the transceivers 120. Thus, in some embodiments, 64 antenna elements 110 may be arranged in 16 columns, since example shown in FIG. 1 illustrates 16 transceivers 120. There may be 2 phase shifters 130 per column or per transceiver 120, thus 32 phase shifters 130 in total.

Unless specified otherwise, while a certain number of components may be shown in FIG. 1 and subsequent figures, this number is to be understood to be an example of one particular embodiment and that, in other embodiments, more components or less components than shown may be used, all of which embodiments being within the scope of the present disclosure. For example, FIG. 1 illustrates an example of 64 antenna elements 110, 16 transceivers 120, 32 phase shifters 130, and 16 splitters 140, but, in other embodiments, more components or less components than what is shown in FIG. 1 may be used in the antenna apparatus 100.

In general, each of the antenna elements 110 may include one or more radiating elements or passive elements (where the example of FIG. 1 illustrates 3 such elements within each antenna element 110, shown as crosses, but in other embodiments, any one or more of such elements may be included within each antenna element 110). For example, the antenna elements 110 may include dipoles, open-ended waveguides, slotted waveguides, microstrip antennas, patch antennas, and the like. In some embodiments, the antenna elements 110 may include any suitable elements configured to wirelessly transmit and/or receive RF signals. Although some embodiments shown in the present drawings illustrate a certain number of antenna elements 110, it is appreciated that these embodiments may be implemented with an array of any number of two or more antenna elements. Furthermore, although the disclosure may discuss certain embodiments as one type of an antenna array, it is understood that the embodiments disclosed herein may be implemented with different types of antenna arrays, such as time domain beamformers, frequency domain beamformers, dynamic antenna arrays, antenna arrays, passive antenna arrays, and the like.

Each of the transceivers 120 may include components enclosed within a dashed-dotted contour shown in FIG. 1 for one of the transceivers 120 (the one labeled with the reference numeral "120"). As shown in FIG. 1, the transceiver 120 may include a switch 122 to switch the path from the corresponding phase shifter 130 to the RX path or the TX path of the transceiver 120. Although a switch is shown in FIG. 1 to switch between the RX path and the TX path (i.e., the switch 122), in other embodiments of the transceiver 120, other components can be used instead of the switch 122, such as a duplexer. As also shown in FIG. 1, a TX path of the transceiver 120 may include a filter 124-1, an amplifier (e.g., a PA) 126-1, and a TX circuit 128-1 configured to provide a signal to be amplified by the PA 126-1. Similarly, as shown in FIG. 1, a RX path of the transceiver 120 may include a filter 124-2, an amplifier (e.g., an LNA) 126-2, and a RX circuit 128-2 configured to receive a signal from the LNA 126-2.

In various embodiments, the TX and RX circuits 128-1, 128-2 (which, together, may be referred to as a TX/RX circuit 128) may include upconverter and/or downconverter circuits. In particular, the TX circuit 128-1 may include an upconverter circuit, while the RX circuit 128-2 may include a downconverter circuit, which, together, may form a UDC circuit.

The upconverter circuit of the TX circuit 128-1 may include a frequency mixer (which may be referred to as an "upconverting mixer") that may have, at least, two inputs and one output. The two inputs of the upconverting mixer may include an input signal that is indicative of (e.g., may include or be) a local oscillator (LO) signal, and a TX signal of a lower frequency, e.g., a TX signal at intermediate frequency (IF). The output of the upconverting mixer may be coupled to the PA 126-1. The upconverting mixer may be configured to receive an IF TX signal (i.e., the lower frequency, e.g. IF, signal to be transmitted by the antenna array) at its' first input and receive an LO signal at its' second input, and mix these two signals to upconvert the IF TX signal to the desired RF frequency, producing the upconverted RF TX signal to be provided to the PA 126-1. The PA 126-1 is configured to amplify the upconverted RF TX signal provided thereto and provide it to one or more of the antenna elements 110, via the phase shifters 130, possibly subject to filtering by an optional filter 124-1.

The downconverter circuit of the RX circuit 128-2 may include a frequency mixer (which may be referred to as a "downconverting mixer") that may have, at least, two inputs and one output. The downconverting mixer may have, at least, two inputs and one output. The two inputs of the downconverting mixer may include an input from the LNA 126-2 and an input signal indicative of the LO signal. The output of the downconverting mixer may be a downconverted signal, which may, e.g., be an IF signal. The downconverting mixer may be configured to receive an RF RX signal from the RX path of the transceiver 120, after it has been amplified by the LNA 126-2, at its' first input and receive an LO signal at its' second input, and mix these two signals to downconvert the RF RX signal to a lower frequency, producing the downconverted RX signal, e.g., the RX signal at the IF.

As is known in communications and electronic engineering, an IF is a frequency to which a carrier wave may be shifted as an intermediate step in transmission or reception. The IF signal may be created by mixing the carrier signal with an LO signal in a process called heterodyning, resulting in a signal at the difference or beat frequency. Conversion to IF may be useful for several reasons. One reason is that, when several stages of filters are used, they can all be set to a fixed frequency, which makes them easier to build and to tune. Another reason is that lower frequency transistors generally have higher gains so fewer stages may be required. Yet another reason is to improve frequency selectivity because it may be easier to make sharply selective filters at lower fixed frequencies.

It should also be noted that, while some descriptions provided herein refer to some signals as IF signals, these descriptions are equally applicable to embodiments where these signals are baseband signals. In such embodiments, frequency mixing of the upconverting and downconverting mixers may be a zero-IF mixing (also referred to as a "zero-IF conversion") in which an LO signal used to perform the mixing may have a center frequency in the band of RF RX/TX frequencies.

Although not specifically shown in FIG. 1, in further embodiments, the transceiver 120 may further include a balancer, e.g., in each of the TX and RX paths, configured to mitigate imbalances in the in-phase (I) and quadrature (Q) signals due to mismatching. Furthermore, although also not specifically shown in FIG. 1, in other embodiments, the antenna apparatus 100 may include further instances of a combination of the antenna elements 110, the transceivers 120, and the phase shifters 130 as described herein. In some such embodiments, the phase shifters 130 may be used to perform phase synchronization/matching between different TX/RX circuits 128 of the antenna apparatus 100.

The antenna apparatus 100 can steer an electromagnetic radiation pattern of the antenna array that includes the antenna elements 110 in a particular direction, thereby enabling the antenna array to generate a main beam in that direction and side lobes in other directions. The main beam of the radiation pattern may be generated based on constructive inference of the transmitted RF signals based on the transmitted signals' phases. The side lobe levels may be determined by the amplitudes of the RF signals transmitted by the antenna elements. The antenna apparatus 100 can generate desired antenna patterns by providing phase shifter settings for the antenna elements 110, e.g., using the phase shifters 130 as described herein.

A Phase Shifter Using a Switch-Based Feed Line Splitter

Figure 2:
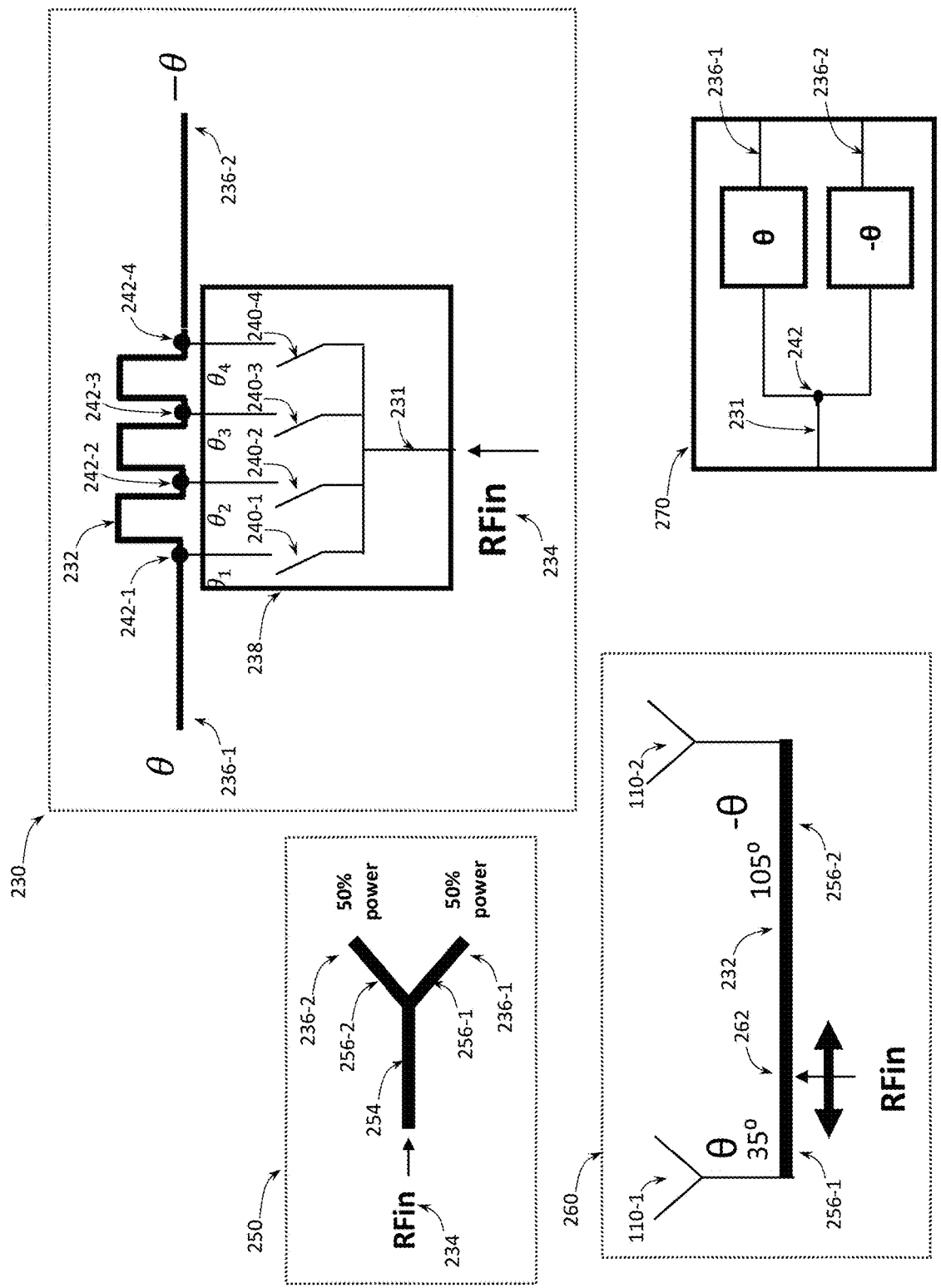
FIG. 2 provides a schematic illustration of phase shifting using a switch-based feed line splitter, according to some embodiments of the present disclosure.

Further details of phase shifting using a switch-based feed line splitter are shown in FIG. 2. In particular, FIG. 2 illustrates a phase shifter 230 which may be an example of, or included in, any of the phase shifters 130 shown in FIG. 1, according to some embodiments of the present disclosure.

As shown in FIG. 2, the phase shifter 230 may include a first feed line 231 and a second feed line 232. An RF input signal 234 may be provided, at an input to the phase shifter 230, to the first feed line 231. The feed line 231 may be coupled to a point of the second feed line 232 that is referred to herein as a "coupling point," so that the RF input signal 234 is split into RF output signals 236-1 and 236-2, which may be provided at two outputs of the phase shifters 230. In particular, the first feed line 231 may be coupled to a switch arrangement (e.g., a multiplexer) 238 that may include a plurality of switches 240 which may be used to selectively connect the RF input signal 234 to different coupling points on the feed line 232 (i.e., the switch arrangement 238 may be used to select one of the locations of the coupling points on the feed line 232 for coupling the first feed line 231 to). For example, in some embodiments, the switch arrangement 238 may include four switches, shown in FIG. 4 as switches 240-1, 240-2, 240-3, and 240-4, which may be configured to couple the feed line 231 to the feed line 232 at one of the four coupling points 242, shown in FIG. 4 as coupling points 242-1, 242-2, 242-3, and 242-4. Each of the switches 240 may be in one of two states. In a first state (e.g., closed), the switch 240 enables a portion of the RF input signal 234 to be transmitted through the switch, and in a second state (e.g., open), the switch 240 disables transmission of a portion of the RF input signal 234. In some embodiments, the switch arrangement 238 may be such that, during operation of the phase shifter 230, one of the switches 240 may be closed while the other switches 240 may be open. In this manner, the switch arrangement 238 may couple the RF input signal 234 in the first feed line 231 to the feed line 232 at the coupling point 242 at a location where the switch that is closed is coupled to the feed line 232.

While four switches 240 are shown in FIG. 2, in other embodiments, any other number of two or more switches 240 may be used. Furthermore, the number of different coupling points 242 does not have to be equal to the number of the switches 240 and, in further embodiments, the switch arrangement 238 may include any number of two or more switches 240 arranged so that the switch arrangement 238 may couple the feed line 231 to the feed line 232 at any of a plurality of different coupling points 242 between the two opposing ends of the feed line 232.

The feed line 232 may have two branches/portions, which means that the RF input signal 234 enters a split in the feed line 232 at a point where the feed line 231 is coupled to the feed line 232 (i.e., at the coupling point 242). As shown with an illustration 250, also provided in FIG. 2, if the impedance of all branches (e.g., of two branches 256-1 and 256-2) is the same, then the power of the signal provided by the input 254 may be split evenly. Thus, the power of the RF input signal 234 may be split evenly, i.e., 50% and 50%, between an RF output signal 236-1 in the first branch 256-1 and an RF output signal 236-2 in the second branch 256-2. In some embodiments, an impedance of the input line 254 to the feed line 232 (i.e., the line supporting propagation of the RF input signal 234) may be 50 Ohm ($\Omega$). In some embodiments, to make the impedance of the splitter 500, the impedance of each of the branches 256-1 and 256-2 may be set to be equal to a square root of the splitter impedance, e.g., 70.71 $\Omega$ for a 50$\Omega$ splitter. Making the impedance of the splitter to be 50 $\Omega$ may be desirable in order to avoid impedance mismatch losses. If the two output lines are designed to be 70.71$\Omega$(50*$\sqrt{2}$), then the impedance looking into the point where the signal splits looks like 50$\Omega$, and so no mismatch losses are introduced.

FIG. 2 further provides an illustration 260 that shows that a point 262 at which the input line 234 coupled to the feed line 232, thus splitting the feed line 232 into two (or more) branches 256, may be used to define the phase shift realized by each of the branches 256. In particular, the point 262 at which the RF input signal 234 is provided to the feed line 232 to be split defines the electrical path length that the RF energy of the split signal will travel down each respective path/branch 256 of the feed line splitter, which, in turn, changes the phase shift realized at each output of the feed line splitter. For example, as shown in the illustration 260, a phase shift of 35° may be realized on the branch 256-1 and 105° may be realized on the branch 256-2. Each of the branches 256 may be coupled to a respective antenna element 110, as also shown in the illustration 260 of FIG. 2. In other embodiments of a feed line splitter as shown in the illustration 260, the length of the feed line 232 may be such that coupling the feed line 231 to one of the predefined locations of the coupling point on the feed line 232 may realize a final phase shift of a certain angle $\theta$ for the output RF signal 236-1 from the first branch 256-1 and a phase shift of angle $-\theta$ for the output RF signal 236-2 from the first branches 256-2. In phase shifter 230, if the line length between the feed line connection points is such as to realize a phase shift of 45°, with switch 240-1 on and the others off, $\theta$ may be 0°, and $-\theta$ may be 0°, if assumed the phase shift is relative to the first or zero phase shift state. With switch 240-2 on and the others off, $\theta$ may be +45°, and $-\theta$ may be −45°. With switch 240-3 on and the others off, $\theta$ may be +90°, and $-\theta$ may be −90°. With switch 240-4 on and the others off, $\theta$ may be +135°, and $-\theta$ may be −135°. As such the differential nature of the approach is illustrated. This is also shown in a schematic illustration 270, also provided in FIG. 2, illustrating that a single switch 240 can create two differentially phase shifted signals 236-1 and 236-2 from the RF input signal 234. By feeding the RF input signal 234 at different points on a transmission line (e.g., on the feed line 232), it is possible to create a differential phase shift (i.e., a phase shift of θ in one branch and a phase shift of −θ in another branch). The point at which the RF input signal 234 is fed to the transmission line may be controlled by which one of the switches 240 of the switch arrangement 238 is closed. Thus, as schematically indicated in the phase shifter 230 with angles $\theta_1$, $\theta_2$, $\theta_3$, and $\theta_4$, closing the first switch 240-1 may create differential phase shifts of $\theta_1$ and $-\theta_1$ for the output signals 236-1 and 236-2 respectively, closing the second switch 240-2 may create differential phase shifts of $\theta_2$ and $-\theta_2$ for the output signals 236-1 and 236-2 respectively, closing the third switch 240-3 may create differential phase shifts of $\theta_3$ and $-\theta_3$ for the output signals 236-1 and 236-2 respectively, and closing the fourth switch 240-4 may create differential phase shifts of $\theta_4$ and $-\theta_4$ for the output signals 236-1 and 236-2 respectively.

In general, the switch arrangement 238 may be any switching device that may connect an input signal (e.g., the RF input signal 234) to a transmission line (e.g., the feed line 232), where the RF power of the input signal can split into two or more branches, where the connecting point can be changed, differentially phase shifting the signal. In various embodiments, any one of the switches 240 may be implemented as semiconductor switches (e.g., transistors, SOI devices, PIN diodes, or other semiconductor-based switching elements) or MEMS switches. In general, different ones of the switches 240 may be implemented as different types of switches, e.g., one of the switches may be implemented as a PIN diode and another one may be implemented as a MEMS switch. In general, a MEMS switch may be implemented as a micrometer-level mechanical movable element which can physically make or break an electrical contact. In some implementations, a MEMS switch may have advantages over other RF switching technologies such as PIN, SOI, etc., in terms of the transmission loss, linearity, power handling, and power to drive.

Examples of Splitters with Multiple Phase Shifters

Figure 3A:
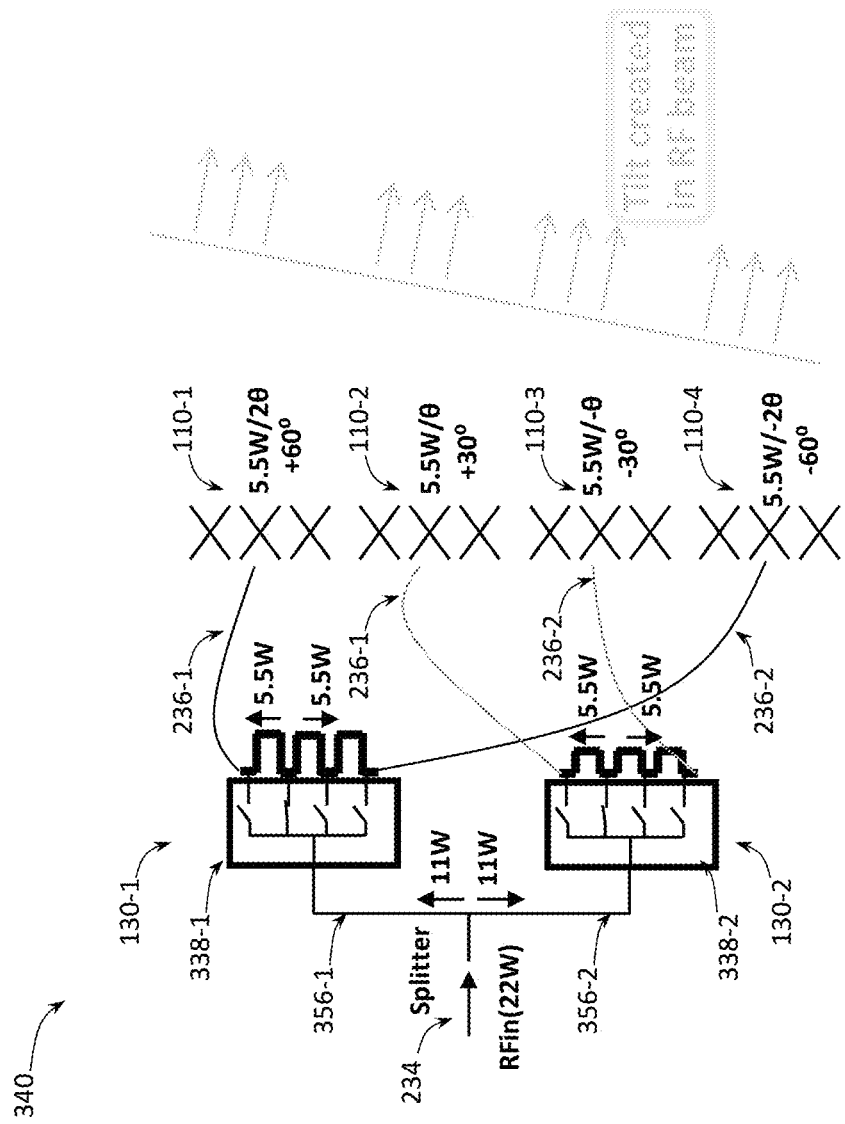
FIG. 3A provides a schematic illustration of a splitter with two phase shifters, each implemented as a switch-based feed line splitter, according to some embodiments of the present disclosure.

FIG. 3A provides a schematic illustration of a splitter 340 with two phase shifters 130, each implemented as a switch-based feed line splitter, according to some embodiments of the present disclosure. The splitter 340 may be an example of the splitter 140 shown in FIG. 1, according to some embodiments of the present disclosure. As shown in FIG. 3A, the splitter 340 is a 2× switch splitter (i.e., it includes two phase shifters 130). The outputs of each of the feed lines of each of the phase shifters 130 may be coupled to different antenna elements 110, as, e.g., was described with reference to the illustration 260 shown in FIG. 2. As shown in FIG. 3A, the RF input signal 234 may first be split, e.g., 50/50, among two branches 356-1 and 356-2, and each of the branches 356 may include a corresponding respective phase shifter 130 (shown in FIG. 3A as the phase shifter 130-1 in the branch 356-1 and the phase shifter 130-2 in the branch 356-2). By means of each of the phase shifters 130, the RF signal is then further split into two output signals 236-1 and 236-2, as described with reference to FIG. 2. In this manner, the power of the RF input signal 234 may be split into 4 RF output signals, each having a quarter of the power of the RF input signal 234. For example, consider that the RF input signal 234 is a 22 Watt (W) signal, then first this power is split to two 11 W (22W/2=11 W) signals in the branches 356-1 and 356-2, and then split again to two 5.5 W (11 W/2=5.5 W) signals in the branches supporting the output signals 236-1 and 236-2, for each of the two branches 356, as illustrated in FIG. 3A. As also illustrated in FIG. 3A, the first phase shifter 130-1 may enable provision of an RF signal 236-1 with a phase shift of 2θ (e.g., 60 degrees) to the antenna element 110-1 and provision of an RF signal 236-2 with a phase shift of −2θ (e.g., −60 degrees) to the antenna element 110-4. On the other hand, the second phase shifter 130-2 may enable provision of an RF signal 236-1 with a phase shift of θ (e.g., 30 degrees) to the antenna element 110-2 and provision of an RF signal 236-2 with a phase shift of −θ (e.g., −30 degrees) to the antenna element 110-3. The θ and 2θ nature of the phase shift means that the phase shift created by 130-1 is double 130-2, by virtue of the fact that the feed line length, and/or the line length between switch connection points is twice the length. This relationship where phase shifts of one phase shifter are double that (or, in general, any integer multiple greater than 1) of a phase shifter driving antennae in the same column may be particularly effective for antenna beam steering.

Figure 3B:
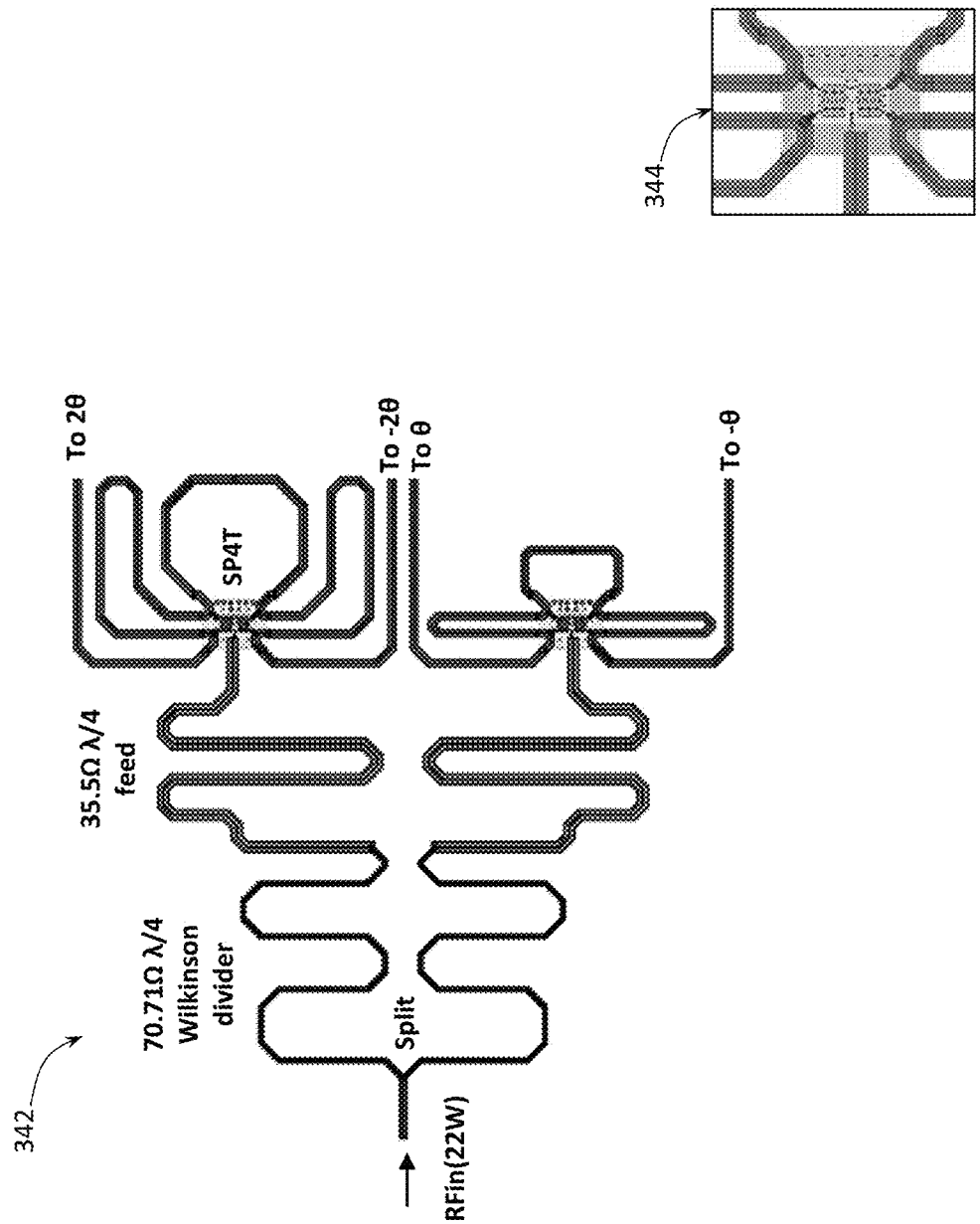
FIGS. 3B and 3C provide different views of an example printed circuit board (PCB) implementation of the splitter of FIG. 3A, according to some embodiments of the present disclosure.
Figure 3C:
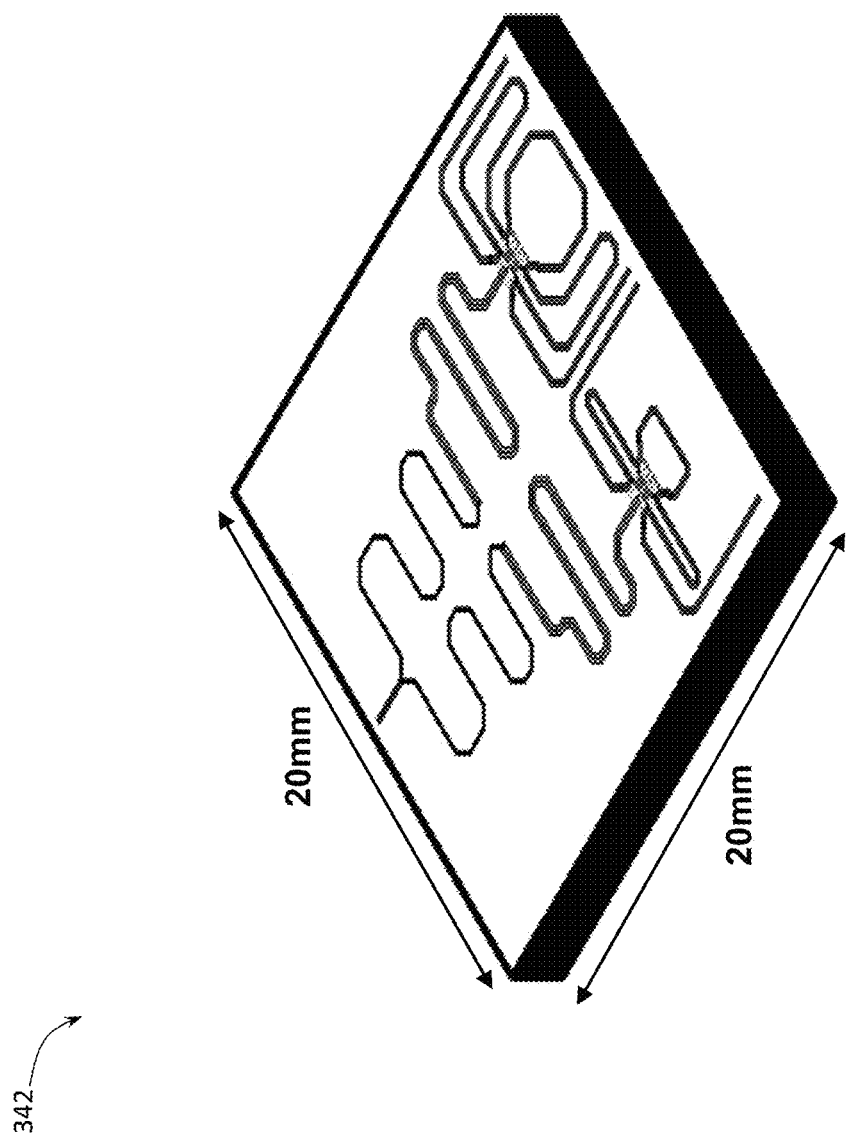

FIG. 3B provides an example PCB implementation 342 of the splitter 340, according to some embodiments of the present disclosure. The PCB layout 342 illustrates an example of PCB Implementation with power splits, impedance transformers and feed line switch splitters, creating 4 phase shifted signals. An inset 344 shown in FIG. 3B illustrates example circuit board implementation of the switch arrangement 238, in particular—a switch device with a flip-chip MEMS implementation. FIG. 3C provides another view for the PCB implementation 342. Implementation 342, including, splitters, quarter wave transformers and switches with feed line splitter, maybe implemented as a standalone module circuit board which is connected both at the input and to the antenna using wire connectors, may also be a subsection of a larger printed circuit board where other circuit elements and sub-circuits may be included.

Figure 4:
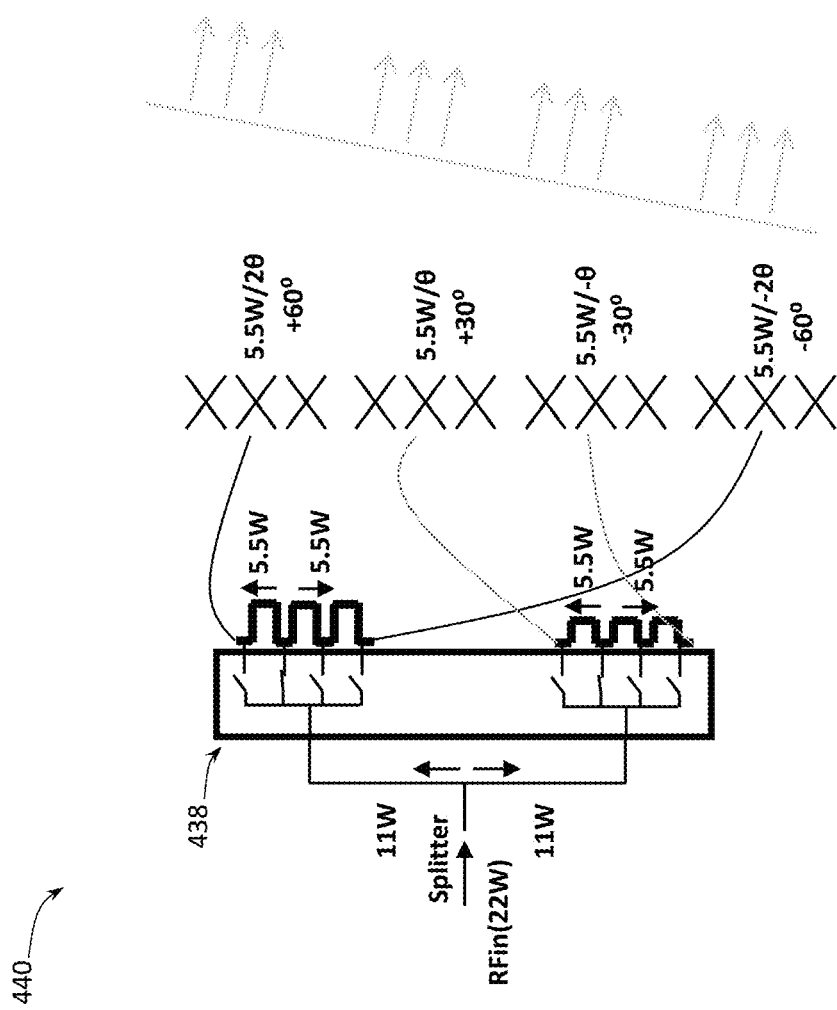
FIG. 4 provides a schematic illustration of a splitter with two switch-based feed line splitter phase shifters where the switch arrangements of the two phase shifters are implemented on a single die, or in a single package, according to some embodiments of the present disclosure.

FIG. 4 provides a schematic illustration of a splitter 440 with two phase shifters 130 where the switch arrangements 238 of the two phase shifters 130 are implemented on a single die or in a single package, where a package may include any number of die, e.g., mounted on and electrically connected to a metal frame and e.g. encased in plastic, according to some embodiments of the present disclosure. The splitter 440 may be an example of the splitter 140 shown in FIG. 1, according to some embodiments of the present disclosure. The splitter 440 shown in FIG. 4 is substantially analogous to that shown in FIG. 3A, the description of which, therefore, is not repeated here in the interests of brevity and only the differences are described. In particular, while the splitter 340 shown in FIG. 3A illustrates that the switch arrangements 238 of the different ones of the phase shifters 130 are implemented on different dies 338-1 and 338-2, the splitter 440 shown in FIG. 4 illustrates that the switch arrangements 238 of the different ones of the phase shifters 130 may be implemented on a single die 438. FIG. 4 illustrates that multiple multiplexers may advantageously be put in one package to reduce number of parts required. The splitter 440 may be implemented with other variants described herein, such as quarter wave. Furthermore, although it may not be specifically stated, various embodiments with multiple phase shifters, described herein, may also be implemented with the switch arrangements 238 of two or more of such phase shifters being implemented on a single die or package as shown in FIG. 4.

Figure 5:
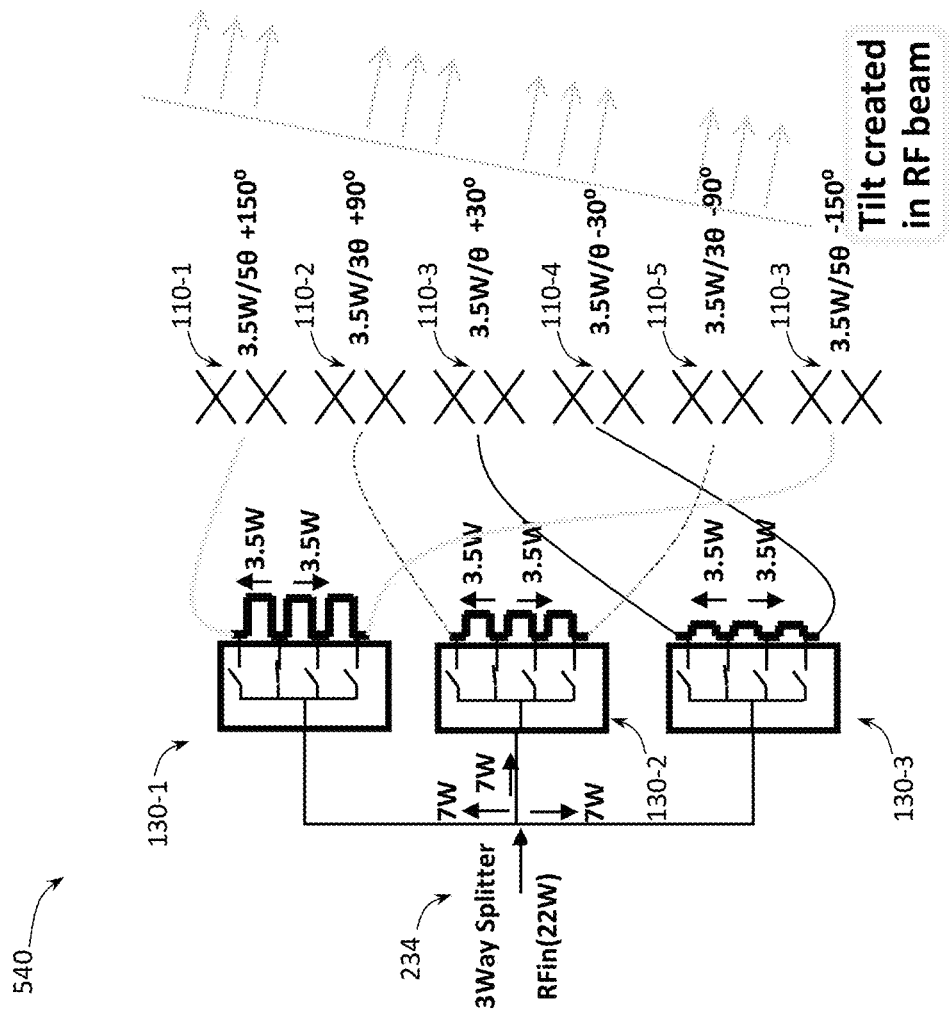
FIG. 5 provides a schematic illustration of a splitter with three phase shifters, each implemented as a switch-based feed line splitter, according to some embodiments of the present disclosure.

FIG. 5 provides a schematic illustration of a splitter 540 with three phase shifters 130, each implemented as a switch-based feed line splitter, according to some embodiments of the present disclosure. The splitter 540 may be an example of the splitter 140 shown in FIG. 1, according to some embodiments of the present disclosure. The splitter 540 shown in FIG. 5 is substantially analogous to that shown in FIG. 3A, the description of which, therefore, is not repeated here in the interests of brevity and only the differences are described. In particular, while the splitter 540 shown in FIG. 5 illustrates that, instead of splitting the RF input signal 234 2-way as was shown in FIG. 3A, in some embodiments, the RF input signal 234 may be split 3-way, as e.g., shown in FIG. 5 with the 3-way splitting of a 22 W RF input signal 234 into 3 signals of about 7 W. For each of the split 7 W signals, a respective phase shifter 110 is provided, as shown in FIG. 5. In this manner, 3 phase shifters 130 may be used to drive 6 antenna elements 110, as shown in FIG. 5, which may provide a higher performing antenna compared to that of FIG. 3A because FIG. 3A illustrated 2 phase shifters 130 driving 4 antenna elements 110. As illustrated in FIG. 5, the first phase shifter 130-1 may enable provision of an RF signal 236-1 with a phase shift of 5θ (e.g., 150 degrees) to the antenna element 110-1 and provision of an RF signal 236-2 with a phase shift of −5θ (e.g., −150 degrees) to the antenna element 110-6; the second phase shifter 130-2 may enable provision of an RF signal 236-1 with a phase shift of 3θ (e.g., 90 degrees) to the antenna element 110-2 and provision of an RF signal 236-2 with a phase shift of −3θ (e.g., −90 degrees) to the antenna element 110-5; and the third phase shifter 130-3 may enable provision of an RF signal 236-1 with a phase shift of θ (e.g., 30 degrees) to the antenna element 110-3 and provision of an RF signal 236-2 with a phase shift of −θ (e.g., −30 degrees) to the antenna element 110-4. The 3-way splitting as shown in FIG. 5 may enable reducing the number of components within each antenna element 110, as shown in FIG. 5 with each antenna element 110 including 2 components as opposed to that of the antenna elements 110 shown in FIG. 3A with 3 components each. The splitter 540 may be implemented with other variants described herein, such as quarter wave and/or single die or package implementation.

Figure 6:
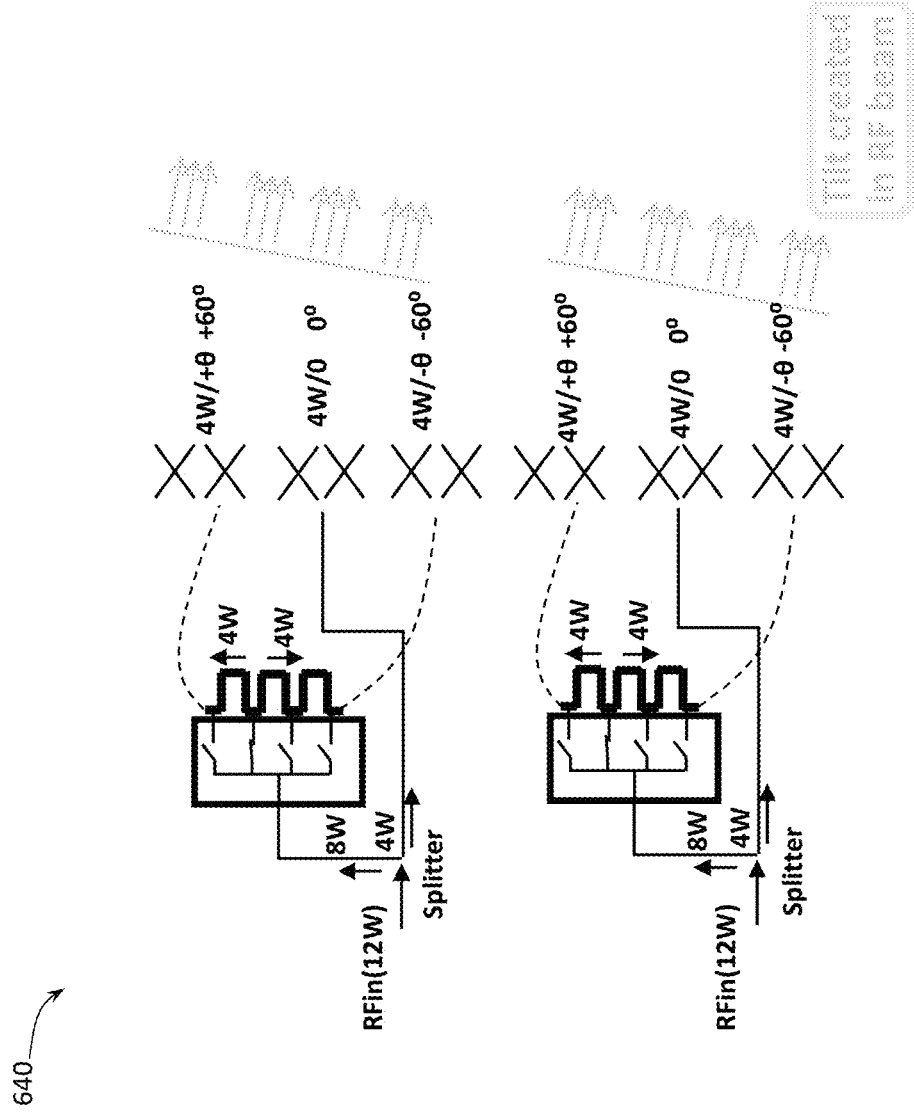
FIG. 6 provides a schematic illustration of two splitters, each with one phase shifter implemented as a switch-based feed line splitter and with one pass-through path, according to some embodiments of the present disclosure.

FIG. 6 provides a schematic illustration of two splitters 640-1 and 640-2, each with one phase shifter implemented as a switch-based feed line splitter and with one pass-through path, according to some embodiments of the present disclosure. Each of the splitters 640 may be an example of the splitter 140 shown in FIG. 1, according to some embodiments of the present disclosure. The architecture as shown in FIG. 6 may allow doubling the transceivers over a 16-transceiver system (i.e., the embodiment of FIG. 6 may be for 32 transceivers 120, compared to 16 transceivers shown in FIG. 1), doubling the control per column. While it may increase the number of parts, it may advantageously enable greater control. In this manner, 2 phase shifters 130 may be used to drive 4 antenna elements 110, as shown in FIG. 6. The splitters 640 may be implemented with other variants described herein, such as quarter wave and/or single die implementation.

Examples of Switch-Based Feed Line Splitters Utilizing Quarter Wave Elements

Figure 7:
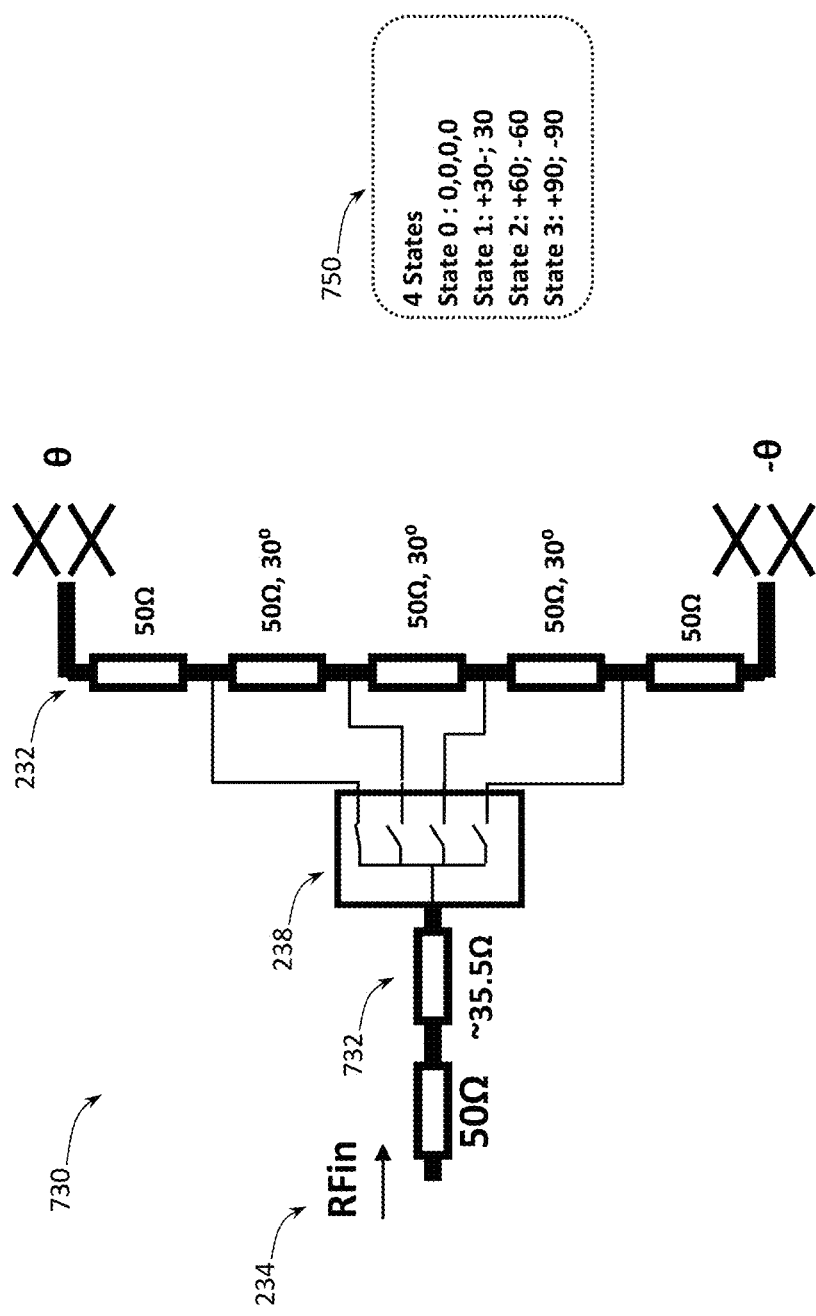
FIG. 7 provides a schematic illustration of a phase shifter with quarter wave impedance transformer to tune out the mismatch of the splitter, according to some embodiments of the present disclosure.

FIG. 7 provides a schematic illustration of a phase shifter 730, implemented as a switch-based feed line splitter, with quarter wave tuning, according to some embodiments of the present disclosure. The phase shifter 730 may be an example of the phase shifter 130 shown in FIG. 1, according to some embodiments of the present disclosure.

As shown in FIG. 7, in some embodiments, the RF input signal 234 may traverse a quarter wave portion 732 having an impedance of substantially $50/\sqrt{2}$ Ω (i.e., substantially 35.5Ω) before entering the switch arrangement 238. Thus, the input impedance of the input line 254 may be adjusted from being 50Ω to being 35.5Ω in the quarter wave portion 732 (i.e., the length of the portion 732 is substantially equal to a quarter of a wavelength of the RF input signal 234 and the impedance of the portion 732 is 35.5Ω). The architecture as shown in FIG. 7 may allow achieving optimal loss, shift and power split. The 35.5 Ω λ/4 impedance transformer at input of the switch arrangement 238 may be used to re-balance the mismatch caused by the splitter branches being formed from two 50Ω branches, thus being substantially lower than 50Ω at the splitting point, leading to mismatch loss. In some embodiments, the feed line 232 may be created with 50Ω line lengths, with switch contacting lines connected the desired phase shift apart along the feed line. Including such 50Ω line portions may ensure that, as signal passes the feed line 232, it has good return loss. In some embodiments, the switch arrangement 238 may be made with very low parasitic inductance and capacitance to avoid changing impedance of the 50Ω line 232. In some embodiments, the phase shifter 730 may be in one of 4 states, as shown with an inset 750 shown in FIG. 7.

Figure 8:
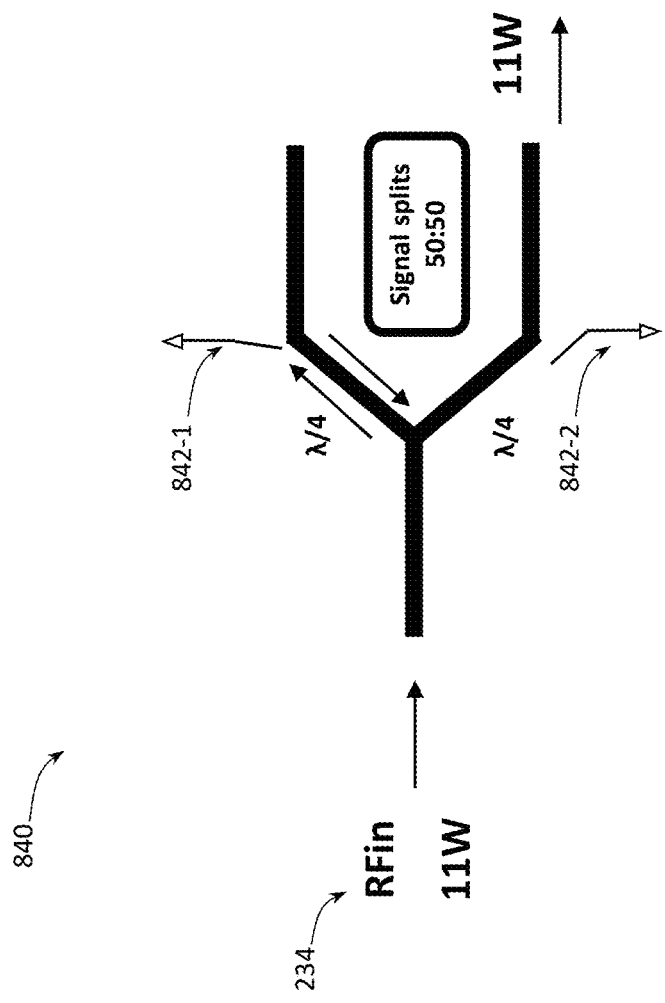
FIG. 8 provides an illustration of a quarter wave switching principle, according to some embodiments of the present disclosure.

In some embodiments, quarter wave portions may be used after the RF input signal 234 is split, as shown in FIG. 8, providing an illustration of a splitter 840 with a quarter wave switching principle, according to some embodiments of the present disclosure. The splitter 840 may be an example of the splitter 140 shown in FIG. 1, according to some embodiments of the present disclosure.

The RF input signal 234 may enters the splitter 840, where it may be split substantially equally between all branches of the split, e.g., it may split 50/50 between two branches. As shown in FIG. 8, in each branch of the split, one quarter wavelength distance away from the splitting point, there may be a switch to ground—shown as a switch 842-1 in the first branch and a switch 842-2 in the second branch. Consider that one switch is closed (e.g., the switch 842-1) and the other one is open (e.g., the switch 842-2). In such a case, when the switch 842-1 is closed, the power of the RF input signal 234 that traverses this branch (i.e., 50% of the power of the RF input signal 234 in this example) may reflect from the switch 842-1 and will undergo a 180 degree phase shift transformation, so the switch 842-1 will appear to the RF input signal as an open circuit. On the other hand, when the switch 842-2 is open, the power of the RF input signal 234 that traverses this branch (i.e., 50% of the power of the RF input signal 234 in this example) will not see the switch 842-2 and pass through, as shown in FIG. 8. Although FIG. 8 illustrates an example with a 2-way power split (i.e., there are two branches over which the RF input signal 234 is split), descriptions provided with reference to FIG. 8 may be easily extended to embodiments of any N-way power split, where N is an integer greater than 1. In such embodiments, N−1 switches with connection to ground may be closed and 1 switch with connection to ground may be open, and the split power of the RF input signal 234 will then traverse the branch with the open switch, similar to the example of the lower branch shown in FIG. 8.

Figure 9:
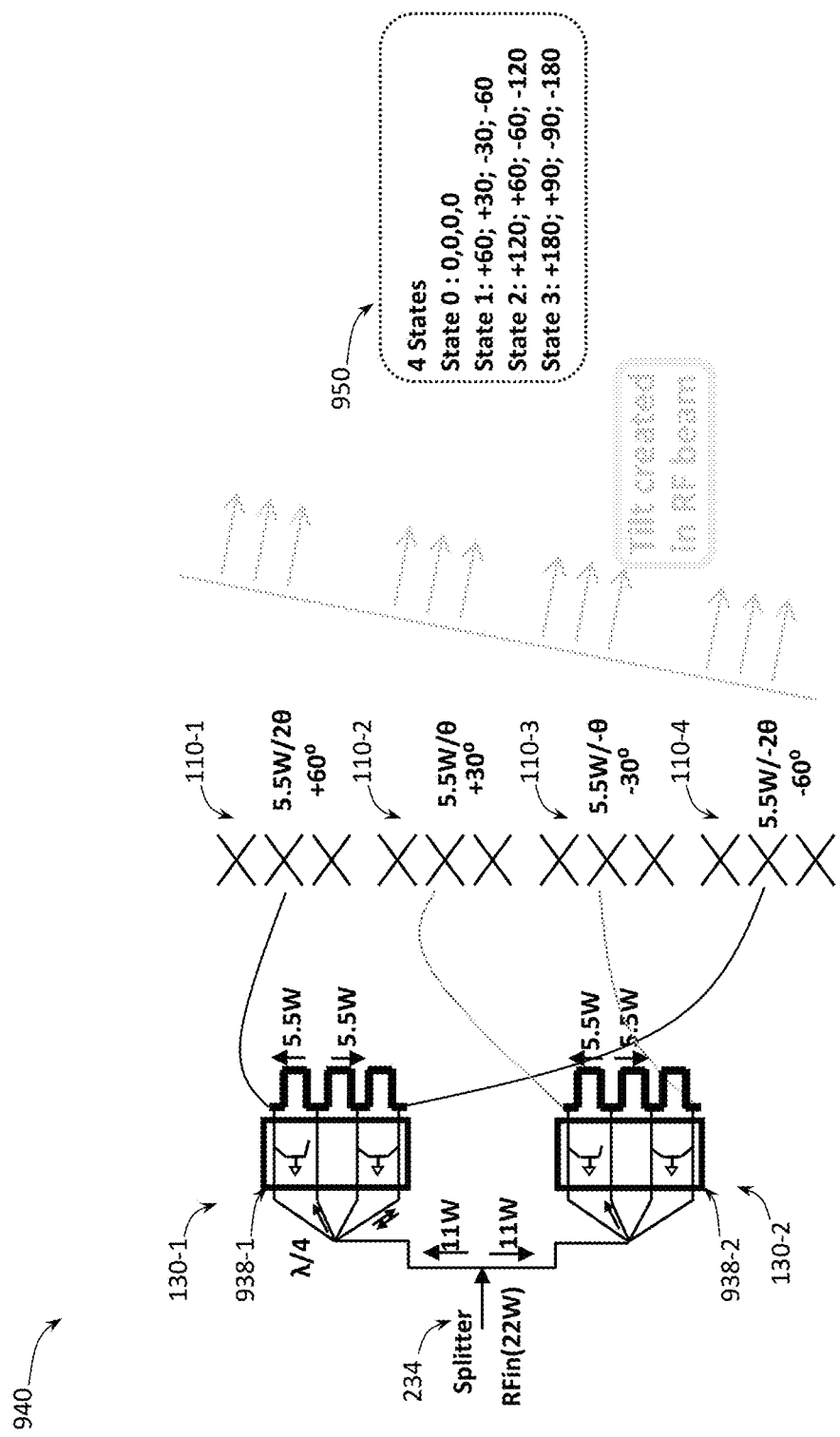
FIG. 9 provides a schematic illustration of a splitter with two switch-based feed line splitter phase shifters with quarter wave and switch to ground implementation, according to some embodiments of the present disclosure.

FIG. 9 provides a schematic illustration of a splitter 940 with two switch-based feed line splitter phase shifters with quarter wave and switch to ground implementation, according to some embodiments of the present disclosure. The splitter 940 may be an example of the splitter 140 shown in FIG. 1, according to some embodiments of the present disclosure. The splitter 940 shown in FIG. 9 is substantially analogous to that shown in FIG. 3A, the description of which, therefore, is not repeated here in the interests of brevity and only the differences are described. In particular, the switch arrangements 938 of each of the phase shifters 130 shown in FIG. 9 (namely, a switch arrangement 938-1 of the phase shifter 130-1 and a switch arrangement 938-2 of the phase shifter 130-2) are configured to implement a quarter wave switching principle as shown in FIG. 8 but for the example of a 4-way power split (as opposed to a 2-way split shown in FIG. 8). As shown in FIG. 9, for each of the switch arrangements 938, 3 switches with connection to ground may be closed and 1 switch with connection to ground may be open, and the split power of the RF input signal 234 will then traverse the branch with the open switch, resulting in the split power of the RF input signal 234 traversing the branch with the open switch. Thus, the phase shift realized at the output of a given feed line 232 would depend in this case on which switch 240 is open (while all the other switches 240 of that switch arrangements 938 are closed). In some embodiments, each of the phase shifters 130 of the splitter 940 may be in one of 4 states, as shown with an inset 950 shown in FIG. 9.

Figure 10:
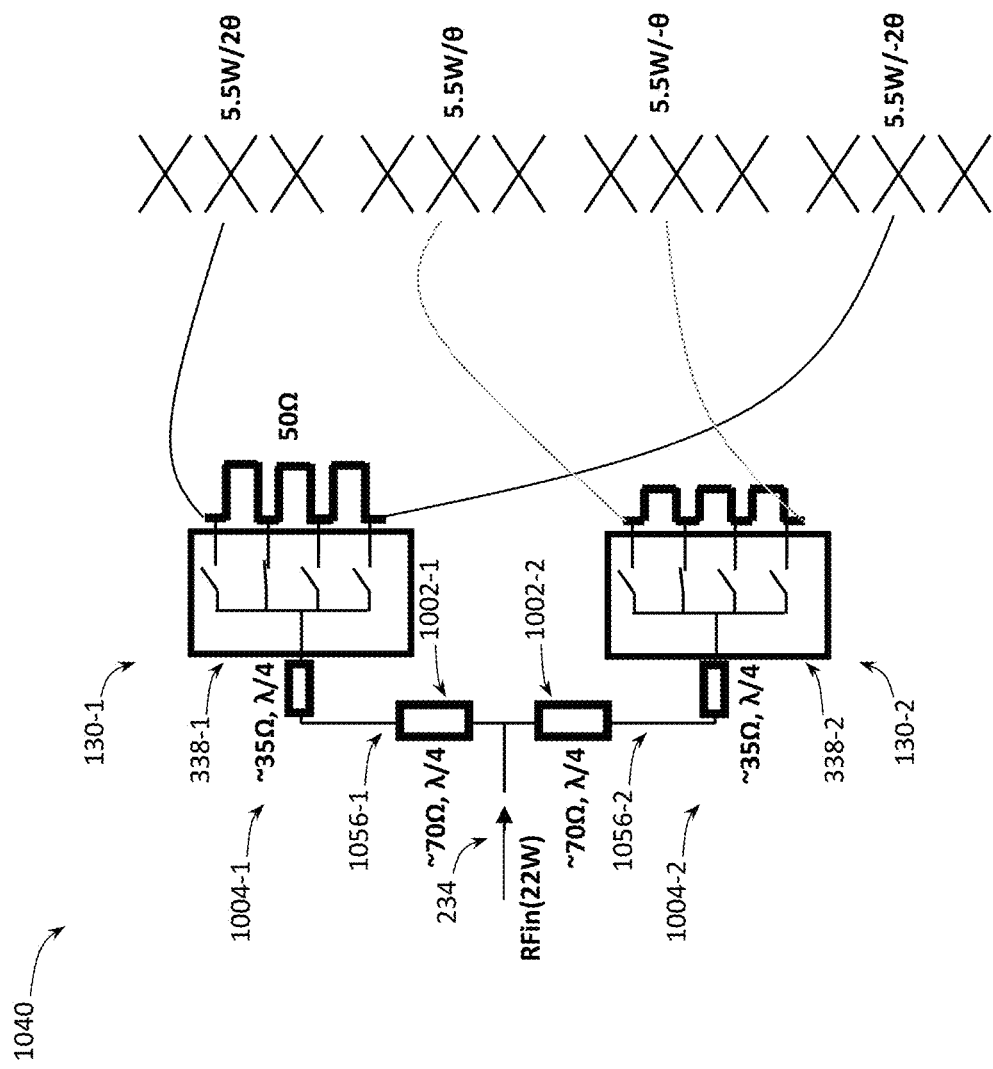
FIG. 10 provides a schematic illustration of a splitter with two switch-based feed line splitter phase shifters with quarter wave impedance transformer and without switch to ground implementation, according to some embodiments of the present disclosure.

FIG. 10 provides a schematic illustration of a splitter 1040 with two switch-based feed line splitter phase shifters with quarter wave and without switch to ground implementation, according to some embodiments of the present disclosure. The splitter 1040 may be an example of the splitter 140 shown in FIG. 1, according to some embodiments of the present disclosure. The splitter 1040 shown in FIG. 10 is substantially analogous to that shown in FIG. 3A, the description of which, therefore, is not repeated here in the interests of brevity and only the differences are described. In particular, FIG. 10 illustrates that, in some embodiments, each of multiple, e.g., 2, branches 1056 over which the RF input signal 234 may be split (namely, a first branch 1056-1 and a second branch 1056-2 shown in FIG. 10 for the example of 2 branches) may include a quarter wave portion 1002 with a 70.71Ω (50√2) impedance, followed by another quarter wave portion 1004 but now with a 35.5Ω (50/√2) impedance, before the RF signal in the branch is split further by the corresponding switch arrangement 338 of the branch. The values of the impedance of the two quarter wave portions 1002 and 1004 may be selected in order to create an impedance transformation, where a line of length one quarter the wavelength and at (50/√2) or 35.5Ω is transformed to 50Ω at the end of the quarter wave line. Likewise, where a line of length one quarter the wavelength and at (50√2) or 70.71Ω is transformed to 50Ω at the end of the quarter wavelength line. In general, these values may be any value(s) suitable for re-balancing the mismatch in impedance created by the mismatch at the splitter, which can be any one of numerous line lengths, impedance values and circuit elements such as capacitances or inductances.

Figure 11:
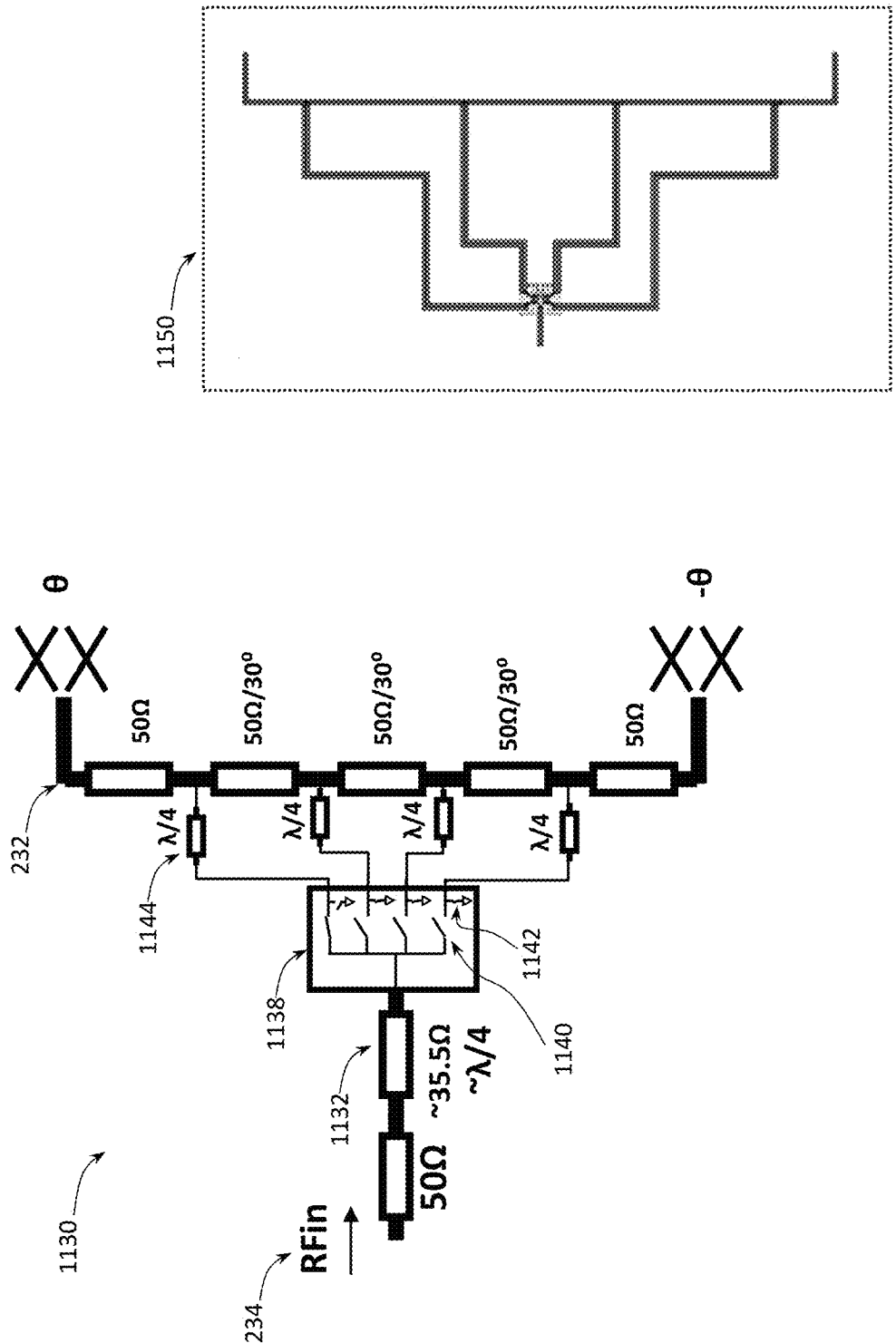
FIG. 11 provides a schematic illustration of a phase shifter, implemented as a switch-based feed line splitter, with quarter wave tuning and switches to ground implementation, according to some embodiments of the present disclosure.

FIG. 11 provides a schematic illustration of a phase shifter 1130, implemented as a switch-based feed line splitter, with quarter wave tuning and switches to ground implementation, according to some embodiments of the present disclosure. The phase shifter 1130 may be an example of the phase shifter 130 shown in FIG. 1, according to some embodiments of the present disclosure. The phase shifter 1130 shown in FIG. 11 is substantially analogous to that shown in FIG. 7, the description of which, therefore, is not repeated here in the interests of brevity and only the differences are described. In particular, FIG. 11 illustrates that, in some embodiments, the RF input signal 234 may traverse a portion 1132 which is substantially similar to the portion 732 shown in FIG. 7 in that it may have a 35.5Ω impedance, but, as shown in FIG. 11, may also have a quarter wave length. In addition, FIG. 11 illustrates that, in some embodiments, a switch arrangement 1138 (substantially similar to the switch arrangement 238) may include a plurality of switches 1140 (substantially similar to the switches 240), but each configured so that it may be connected to the ground using a further switch (referred to as "ground switch") 1142. Only one of the switches 1140 and one of the ground switches 1142 are labeled in FIG. 11 with reference numerals in order to not clutter the drawing, but 4 of such switches 1140 and ground switches 1142 are shown in the example of FIG. 11. The switches 1140 operate as described with reference to the switches 240 shown in FIG. 2, while the ground switches 1142 operate as described with reference to the switches 842 shown in FIG. 8 but shown in FIG. 11 for the example of a 4-way power split (as opposed to a 2-way split shown in FIG. 8). In some embodiments, in a given time, one of the switches 1140 may be closed (with all other of the switches 1140 being open) and a corresponding ground switch 1142 may then be open, resulting in the split portion of the RF input signal 234 traversing that branch of the switch arrangement 1138. At that time, the remaining ground switches 1142 may be either closed or open, which does not matter because the switches 1140 of those remaining ground switches 1142 are open, so no RF signal traverses those branches. Thus, the implementation of FIG. 11 is similar to FIG. 3A but this time using quarter wave feed lines, with a shorting switch associated with each of the switches 240. The ground switch 1142 may make the feed line look like an open when the channel is not being used. FIG. 11 further illustrates that the portions connecting each one of the ground switches 1142 to the feed line 232 may be quarter wave portions 1144 (only one of which is labelled in FIG. 11 with the reference numeral 1144 in order to not clutter the drawing). The inset 1150 shown in FIG. 11 illustrates one example of a PCB implementation of the phase shifter 1130.

Figure 12:
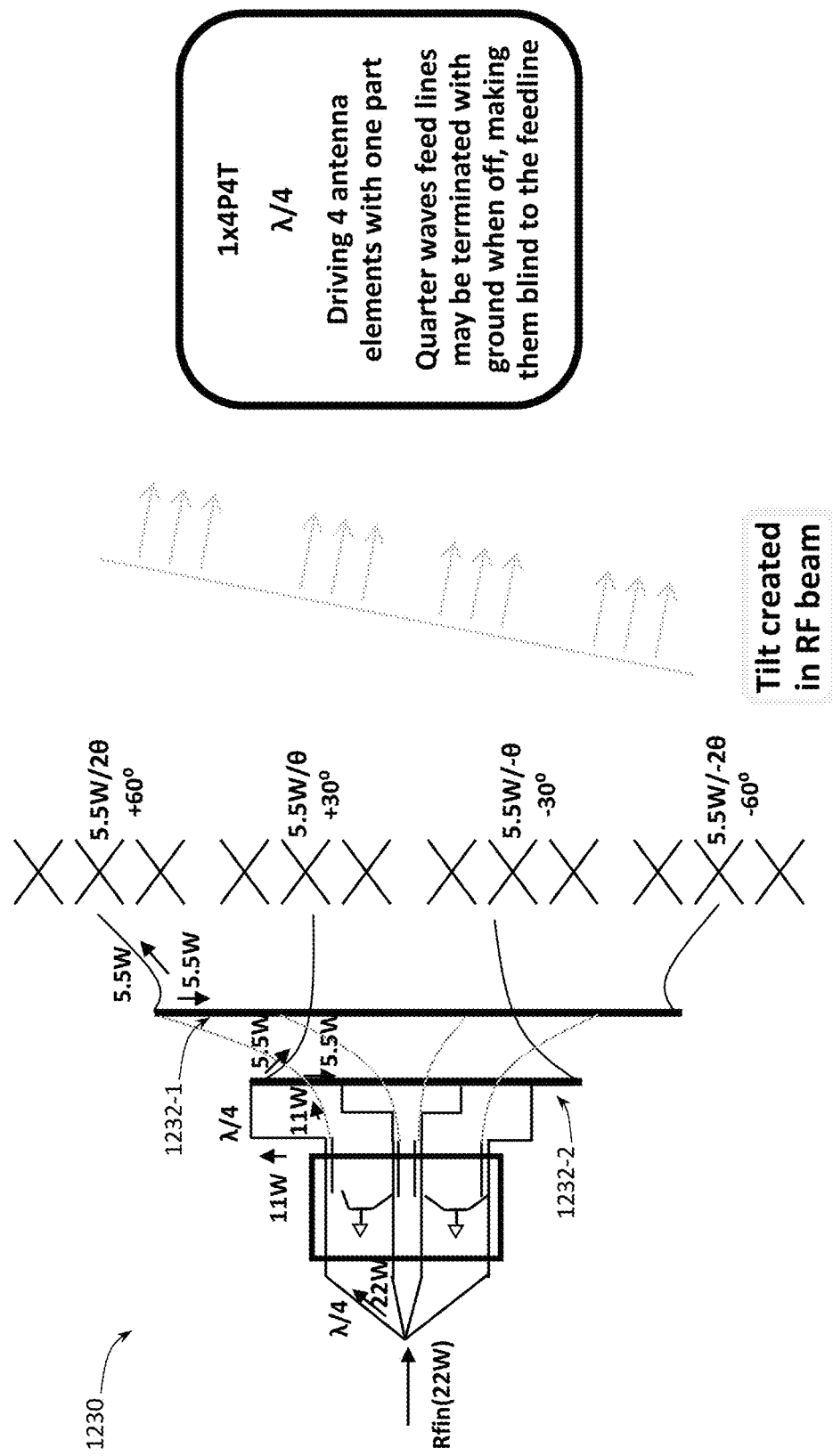
FIG. 12 provides a schematic illustration of a phase shifter, implemented as a switch-based feed line splitter, with quarter wave and switch to ground implementation, according to some embodiments of the present disclosure.

FIG. 12 provides a schematic illustration of a phase shifter 1230, implemented as a switch-based feed line splitter, with quarter wave and switch to ground implementation, according to some embodiments of the present disclosure. The phase shifter 1230 may be an example of the phase shifter 130 shown in FIG. 1, according to some embodiments of the present disclosure. The phase shifter 1230 shown in FIG. 12 is substantially analogous to any one of the two phase shifters 938 shown in FIG. 9, the description of which, therefore, is not repeated here in the interests of brevity and only the differences are described. In particular, FIG. 12 illustrates that, in some embodiments, the phase shifter 1230 may be configured to drive 4 antenna elements with one die or package, where previous embodiments drove 2 antenna elements. In particular, this implementation may use quarter wave switch implementation at the input side as used in FIG. 9, while at the output of the switch, the signal is split again and two quarter wave lines connect to 2 feed lines, 1232-1 and 1232-2, of differing lengths. In some embodiments, the quarter wave lines from the switch to the feed lines may both be terminated to ground quarter wave at the switch, thus making efficient use of this grounding element. As a result, one 4 channel multiplexer may be configured to drive 4 antenna elements with differing and differential phase shifts, where previous embodiments were driving 2 antenna elements.

Further Examples

Figure 13:
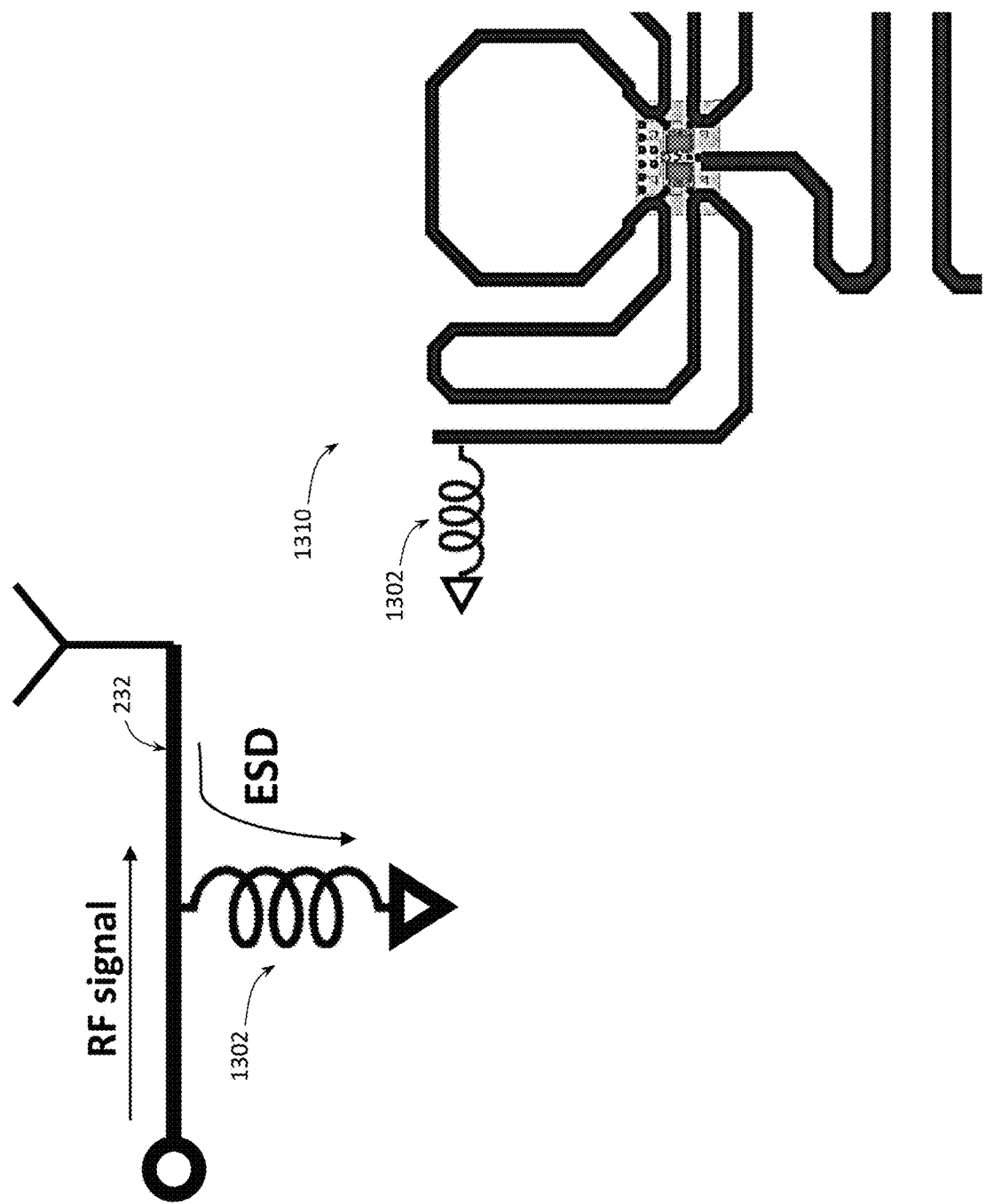
FIG. 13 provides a schematic illustration of electrostatic discharge (ESD) protection with a shunt inductor, according to some embodiments of the present disclosure.

FIG. 13 provides a schematic illustration of ESD protection with a shunt inductor 1302, according to some embodiments of the present disclosure. As shown in FIG. 13, the inductor 1302 may be coupled to ground, ensuring that it has high impedance at the operating frequency. Such an inductor may be configured to short to ground in case of any ESD zaps. Such an inductor/structure may, optionally, be added to any of the nodes 236 or 234 shown in FIG. 2, specifically the feed from the previous stage such as the power amplifier or the output nodes which drive the antenna elements. One example of using the inductor 1302 is shown in FIG. 13 with an illustration 1310, where the illustration 1310 shows a portion of the circuit layout as shown in FIGS. 3B and 3C, described above.

Figure 14:
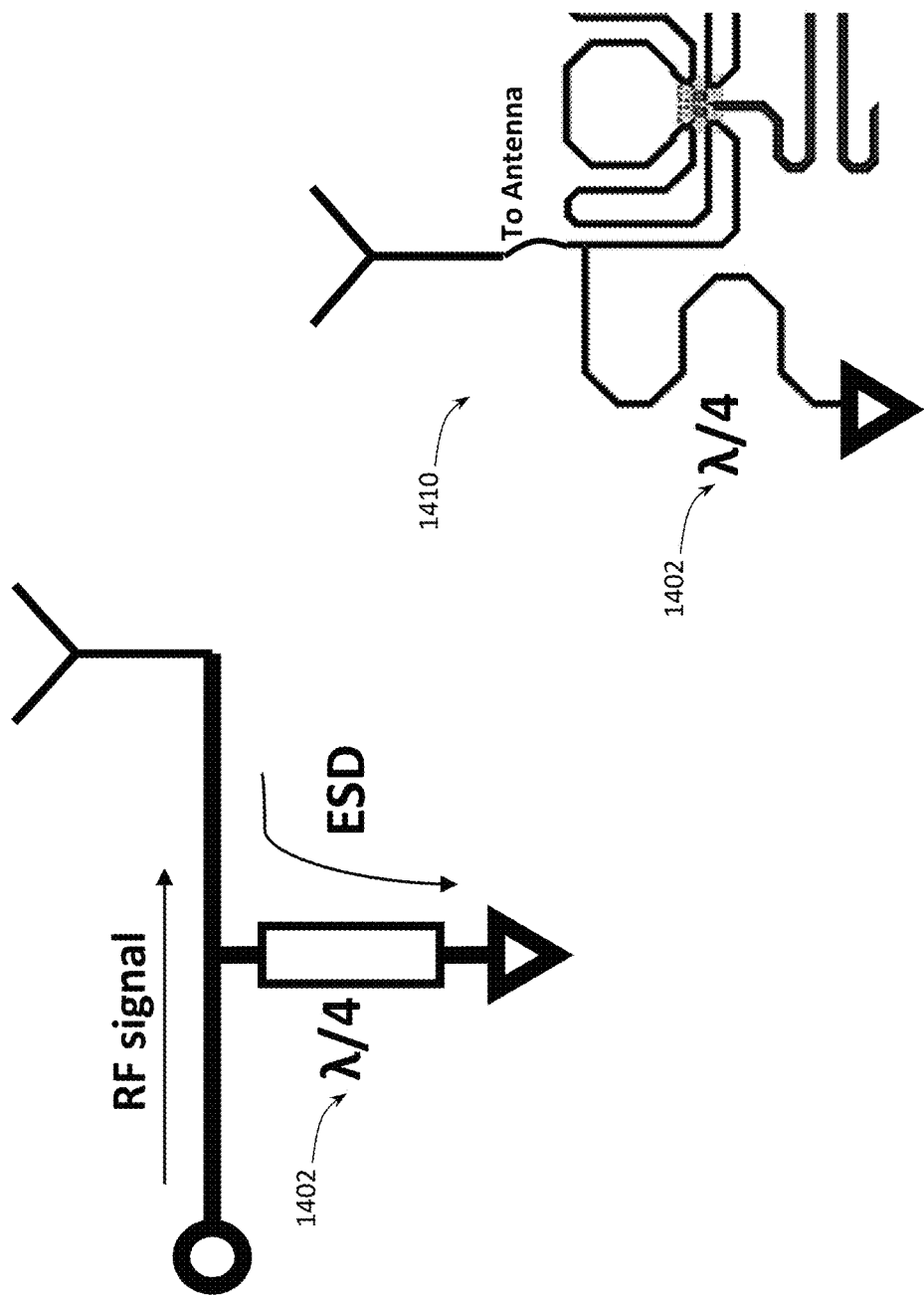
FIG. 14 provides a schematic illustration of ESD protection with a quarter wave stub, according to some embodiments of the present disclosure.

FIG. 14 provides a schematic illustration of ESD protection with a quarter wave stub 1402, according to some embodiments of the present disclosure. As shown in FIG. 14, the quarter wave stub 1402 may be coupled to ground at the operating frequency. Such a quarter wave stub 1402 may, optionally, be added to any of the nodes 236 or 234 shown in FIG. 2, specifically the feed from the previous stage such as the power amplifier or the output nodes which drive the antenna elements. One example of using the quarter wave stub 1402 is shown in FIG. 14 with an illustration 1410, where the illustration 1410 shows a portion of the circuit layout as shown in FIGS. 3B and 3C, described above.

Figure 15:
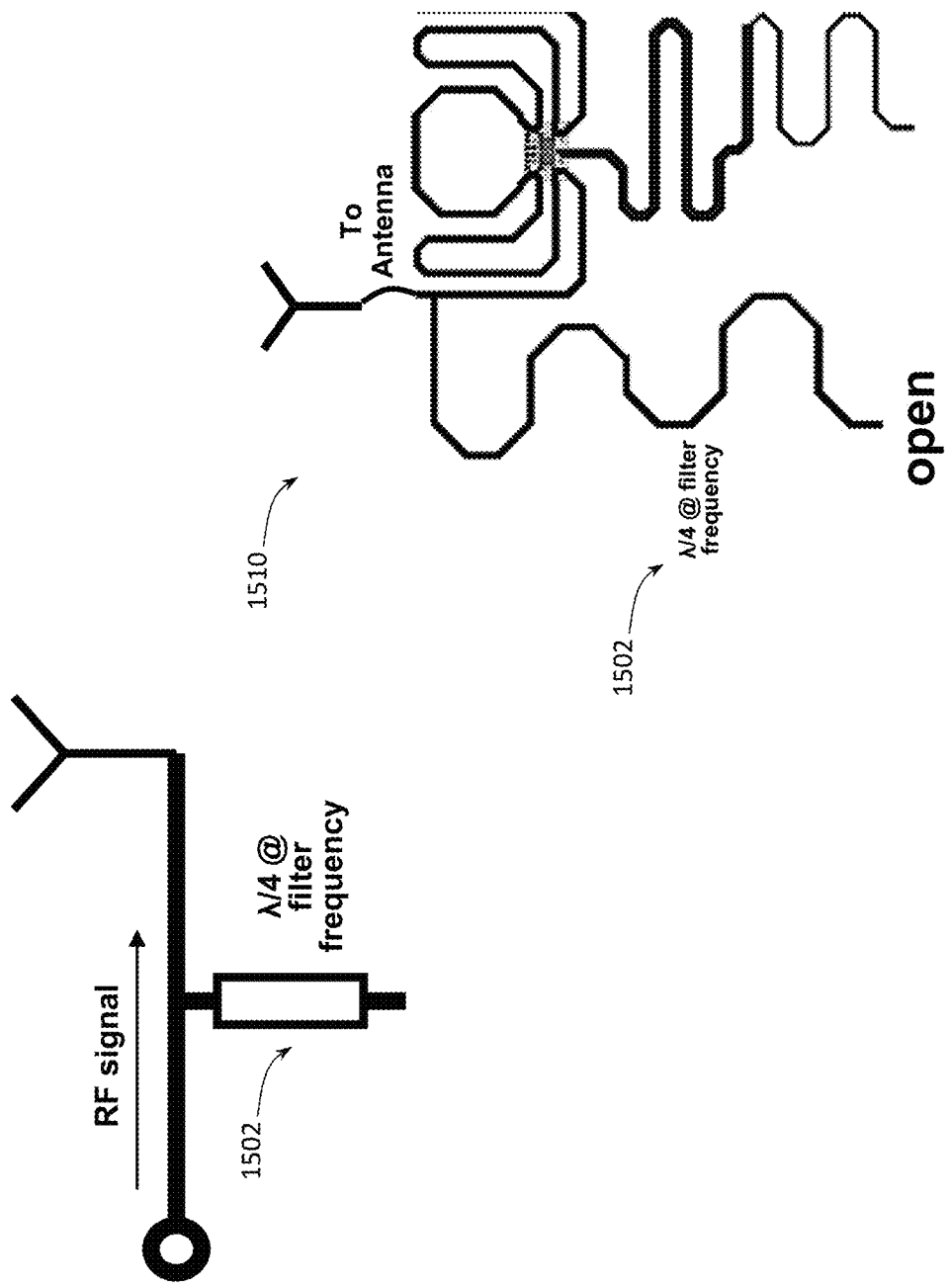
FIG. 15 provides a schematic illustration of a stub bandstop filter, according to some embodiments of the present disclosure.

FIG. 15 provides a schematic illustration of a stub bandstop filter 1502, according to some embodiments of the present disclosure. As shown in FIG. 15, the stub bandstop filter 1502 may be placed on a feed line, with the length of the stub being a quarter wave at the frequency that is desired to filter. Such a stub bandstop filter 1502 may, optionally, be added to any of the nodes 236 or 234 shown in FIG. 2, specifically the feed from the previous stage such as the power amplifier or the output nodes which drive the antenna elements. One example of using the stub bandstop filter 1502 is shown in FIG. 15 with an illustration 1510, where the illustration 1510 shows a portion of the circuit layout as shown in FIGS. 3B and 3C, described above.

Figure 16:
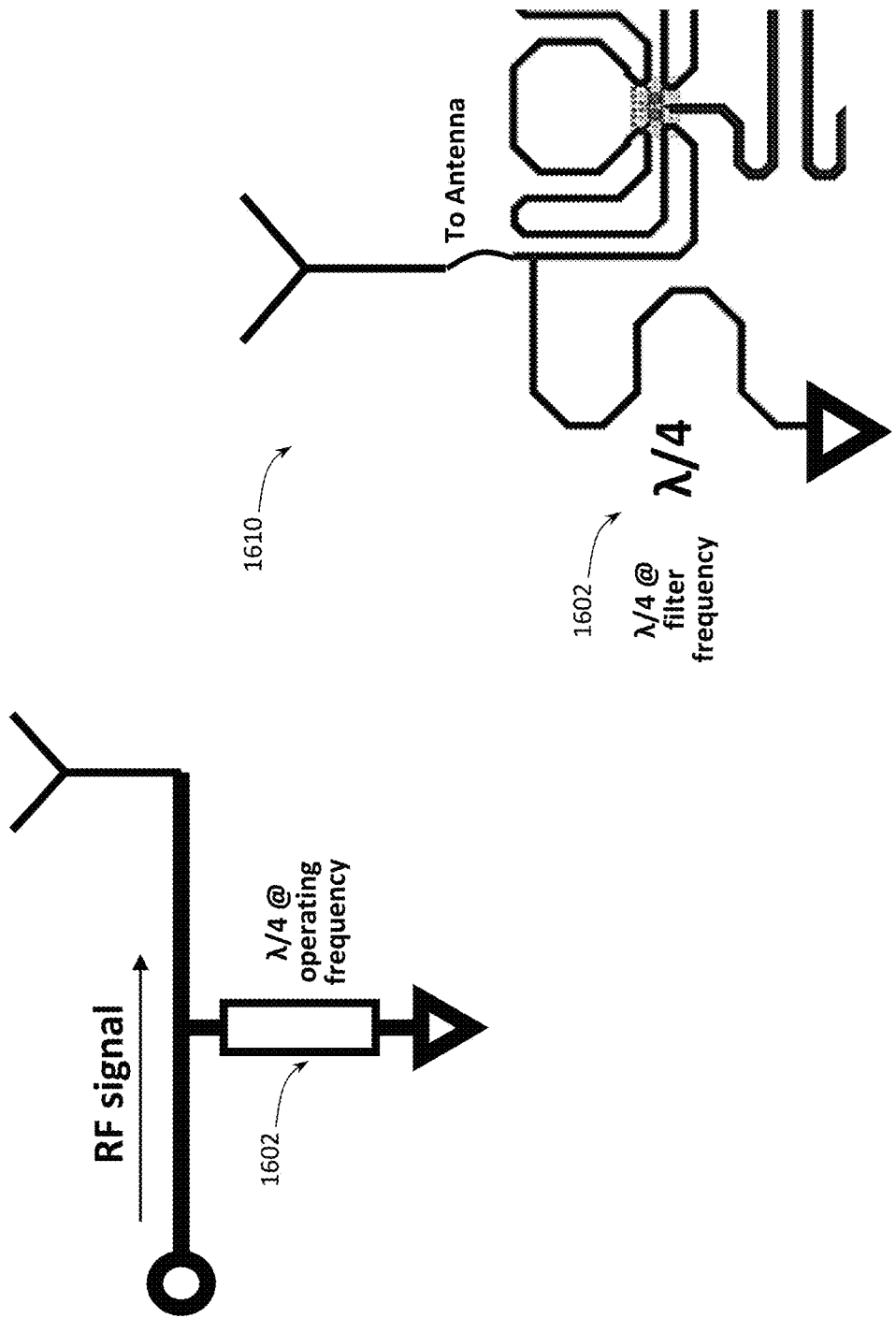
FIG. 16 provides a schematic illustration of a stub bandpass filter, according to some embodiments of the present disclosure FIG. 17 provides a block diagram illustrating an example data processing system that may be configured to implement, or control, at least portions of realizing a phase shift using a switch based feed line splitter, according to some embodiments of the present disclosure.

FIG. 16 provides a schematic illustration of a stub bandpass filter 1602, according to some embodiments of the present disclosure. As shown in FIG. 16, the stub bandpass filter 1602 may be placed on a feed line, with the length of the stub being a quarter wave at the frequency at which it is desired to operate, thereby reducing or altogether removing undesirable signals at other frequencies. Such a stub bandpass filter 1602 may, optionally, be added to any of the nodes 236 or 234 shown in FIG. 2, specifically the feed from the previous stage such as the power amplifier or the output nodes which drive the antenna elements. One example of using the stub bandpass filter 1602 is shown in FIG. 16 with an illustration 1610, where the illustration 1610 shows a portion of the circuit layout as shown in FIGS. 3B and 3C, described above.

Example Data Processing System

Figure 17:
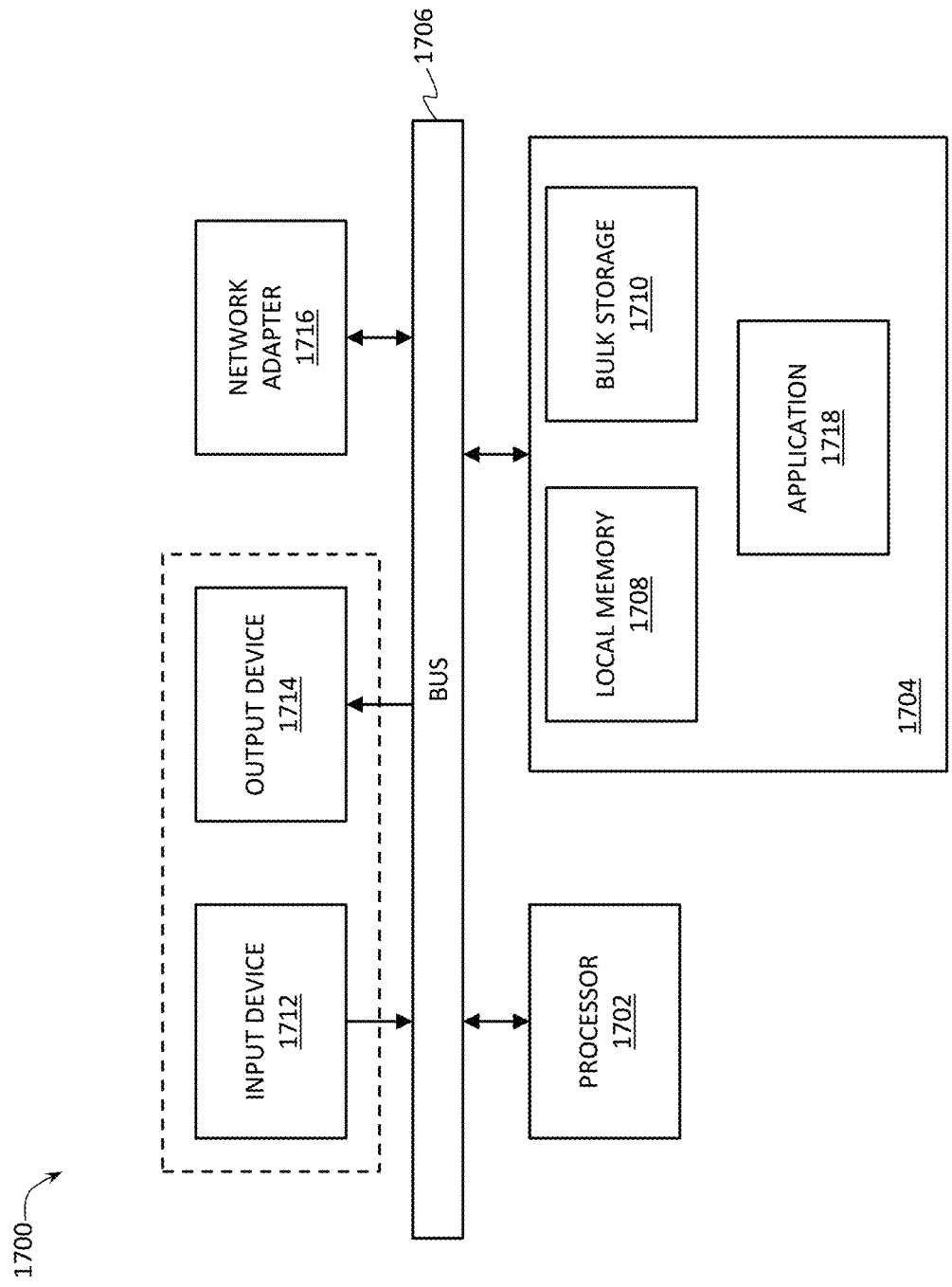

FIG. 17 provides a block diagram illustrating an example data processing system 1700 that may be configured to implement, or control implementations of, at least portions of phase shifters using switch-based feed line splitters as described herein, according to some embodiments of the present disclosure.

As shown in FIG. 17, the data processing system 1700 may include at least one processor 1702, e.g. a hardware processor 1702, coupled to memory elements 1704 through a system bus 1706. As such, the data processing system may store program code within memory elements 1704. Further, the processor 1702 may execute the program code accessed from the memory elements 1704 via a system bus 1706. In one aspect, the data processing system may be implemented as a computer that is suitable for storing and/or executing program code. It should be appreciated, however, that the data processing system 1700 may be implemented in the form of any system including a processor and a memory that is capable of performing the functions described within this disclosure.

In some embodiments, the processor 1702 can execute software or an algorithm to perform the activities as discussed in this specification, in particular activities related to realizing phase shifters using switch-based feed line splitters as described herein. The processor 1702 may include any combination of hardware, software, or firmware providing programmable logic, including by way of non-limiting example a microprocessor, a digital signal processor (DSP), a field-programmable gate array (FPGA), a programmable logic array (PLA), an application specific integrated circuit (IC) (ASIC), or a virtual machine processor. The processor 1702 may be communicatively coupled to the memory element 1704, for example in a direct-memory access (DMA) configuration, so that the processor 1702 may read from or write to the memory elements 1704.

In general, the memory elements 1704 may include any suitable volatile or non-volatile memory technology, including double data rate (DDR) random access memory (RAM), synchronous RAM (SRAM), dynamic RAM (DRAM), flash, read-only memory (ROM), optical media, virtual memory regions, magnetic or tape memory, or any other suitable technology. Unless specified otherwise, any of the memory elements discussed herein should be construed as being encompassed within the broad term "memory." The information being measured, processed, tracked or sent to or from any of the components of the data processing system 1700 could be provided in any database, register, control list, cache, or storage structure, all of which can be referenced at any suitable timeframe. Any such storage options may be included within the broad term "memory" as used herein. Similarly, any of the potential processing elements, modules, and machines described herein should be construed as being encompassed within the broad term "processor." Each of the elements shown in the present figures, e.g., any of the circuits/components shown in FIGS. 1-16, can also include suitable interfaces for receiving, transmitting, and/or otherwise communicating data or information in a network environment so that they can communicate with, e.g., the data processing system 1700 of another one of these elements.

In certain example implementations, mechanisms for implementing phase shifters using switch-based feed line splitters as outlined herein may be implemented by logic encoded in one or more tangible media, which may be inclusive of non-transitory media, e.g., embedded logic provided in an ASIC, in DSP instructions, software (potentially inclusive of object code and source code) to be executed by a processor, or other similar machine, etc. In some of these instances, memory elements, such as e.g. the memory elements 1704 shown in FIG. 17, can store data or information used for the operations described herein. This includes the memory elements being able to store software, logic, code, or processor instructions that are executed to carry out the activities described herein. A processor can execute any type of instructions associated with the data or information to achieve the operations detailed herein. In one example, the processors, such as e.g. the processor 1702 shown in FIG. 17, could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., an FPGA, a DSP, an erasable programmable read-only memory (EPROM), an electrically erasable programmable read-only memory (EEPROM)) or an ASIC that includes digital logic, software, code, electronic instructions, or any suitable combination thereof.

The memory elements 1704 may include one or more physical memory devices such as, for example, local memory 1708 and one or more bulk storage devices 1710. The local memory may refer to RAM or other non-persistent memory device(s) generally used during actual execution of the program code. A bulk storage device may be implemented as a hard drive or other persistent data storage device. The processing system 1700 may also include one or more cache memories (not shown) that provide temporary storage of at least some program code in order to reduce the number of times program code must be retrieved from the bulk storage device 1710 during execution.

As shown in FIG. 17, the memory elements 1704 may store an application 1718. In various embodiments, the application 1718 may be stored in the local memory 1708, the one or more bulk storage devices 1710, or apart from the local memory and the bulk storage devices. It should be appreciated that the data processing system 1700 may further execute an operating system (not shown in FIG. 17) that can facilitate execution of the application 1718. The application 1718, being implemented in the form of executable program code, can be executed by the data processing system 1700, e.g., by the processor 1702. Responsive to executing the application, the data processing system 1700 may be configured to perform one or more operations or method steps described herein.

Input/output (I/O) devices depicted as an input device 1712 and an output device 1714, optionally, can be coupled to the data processing system. Examples of input devices may include, but are not limited to, a keyboard, a pointing device such as a mouse, or the like. Examples of output devices may include, but are not limited to, a monitor or a display, speakers, or the like. In some embodiments, the output device 1714 may be any type of screen display, such as plasma display, liquid crystal display (LCD), organic light emitting diode (OLED) display, electroluminescent (EL) display, or any other indicator, such as a dial, barometer, or LEDs. In some implementations, the system may include a driver (not shown) for the output device 1714. Input and/or output devices 1712, 1714 may be coupled to the data processing system either directly or through intervening I/O controllers.

In an embodiment, the input and the output devices may be implemented as a combined input/output device (illustrated in FIG. 17 with a dashed line surrounding the input device 1712 and the output device 1714). An example of such a combined device is a touch sensitive display, also sometimes referred to as a "touch screen display" or simply "touch screen". In such an embodiment, input to the device may be provided by a movement of a physical object, such as e.g. a stylus or a finger of a user, on or near the touch screen display.

A network adapter 1716 may also, optionally, be coupled to the data processing system to enable it to become coupled to other systems, computer systems, remote network devices, and/or remote storage devices through intervening private or public networks. The network adapter may comprise a data receiver for receiving data that is transmitted by said systems, devices and/or networks to the data processing system 1700, and a data transmitter for transmitting data from the data processing system 1700 to said systems, devices and/or networks. Modems, cable modems, and Ethernet cards are examples of different types of network adapter that may be used with the data processing system 1700.

SELECT EXAMPLES

The following paragraphs provide examples of various ones of the embodiments disclosed herein.

Example A1 provides a phase shifter as described herein for realizing a phase shift in an RF signal of an RF system.

Example A2 provides an antenna apparatus for wirelessly receiving and transmitting RF signals using a plurality of antenna elements of an antenna array, the antenna apparatus comprising a phase shifter as described herein.

Example A3 provides a method of operating a phase shifter as described herein.

Example B1 provides a phase shift module for an antenna apparatus, the phase shift module including a switch arrangement (e.g., a switch arrangement 238, shown in FIG. 2), configured to electrically couple a first feed line (e.g., a feed line 231, shown in FIG. 2) to a coupling point (e.g., one of the coupling points 242, shown in FIG. 2) that is between two opposite ends of a second feed line (e.g., a feed line 232, shown in FIG. 2) so that a power of an RF signal transmitted over the first feed line includes (e.g., is substantially equal to) a sum of a power of an RF signal transmitted over a first portion of the second feed line and a power of an RF signal transmitted over a second portion of the second feed line, where the first portion is a portion of the second feed line between the coupling point and a first antenna element coupled to a first end of the two opposite ends of the second feed line, and the second portion is a portion of the second feed line between the coupling point and a second antenna element coupled to a second end of the two opposite ends of the second feed line. The switch arrangement includes a plurality of switches (e.g., switches 240, shown in FIG. 2) and configured to be in one of a plurality of different states depending on a state of each switch of the plurality of switches. The coupling point is at a first location (e.g., the coupling point is a coupling point 242-1, shown in FIG. 2) of a plurality of different, predefined locations between the two opposite ends of the second feed line when the switch arrangement is in a first state of the plurality of states. The coupling point is at a second location (e.g., the coupling point is a coupling point 242-2, shown in FIG. 2) of the plurality of locations when the switch arrangement is in a second state of the plurality of states, different from the first state.

Example B2 provides the phase shift module according to example B1, where the each switch is configured to be either in a first state (e.g., closed and current may be conducted through the switch) or in a second state (e.g., open and current may not be conducted through the switch).

Example B3 provides the phase shift module according to example B2, where the each switch is coupled between the first feed line and a different location of the plurality of locations between the two opposite ends of the second feed line, and in each of the plurality of different states of the switch arrangement, only one of the plurality of switches is in the first state.

Example B4 provides the phase shift module according to any one of the preceding examples B, where for each of the plurality of locations of the coupling point, the RF signal transmitted over the first portion of the second feed line undergoes a phase shift of an angle $\theta$ and the RF signal transmitted over the second portion of the second feed line undergoes a phase shift of an angle −θ, and a value of the angle θ is different for different locations of the coupling point.

Example B5 provides the phase shift module according to example B4, where the plurality of locations of the coupling point include a first location, a second location, a third location, and a fourth location, the value of the angle θ is 0 degrees when the coupling point is at the first location, the value of the angle θ is 45 degrees when the coupling point is at the second location, the value of the angle θ is 90 degrees when the coupling point is at the third location, and the value of the angle θ is 135 degrees when the coupling point is at the fourth location.

Example B6 provides the phase shift module according to any one of the preceding examples B, where the first feed line includes a first portion and a second portion, the second portion being a portion of the first feed line that is closest to and coupled to the coupling point, and the first portion being electrically coupled to the first portion, the second portion of the first feed line includes an impedance transformer configured to transform an impedance of the first feed line from being at a first value at the first portion of the first feed line to being at a second value at the second portion of the first feed line.

Example B7 provides the phase shift module according to example B6, where the second value is substantially equal to 50/$\sqrt{2}$ Ohm.

Example B8 provides the phase shift module according to examples B6 or B7, where a length of the second portion of the first feed line is substantially equal to a quarter of a wavelength of the RF signal transmitted over the first feed line.

Example B9 provides the phase shift module according to any one of the preceding examples B, where an impedance of the second feed line is substantially equal to 50 Ohm.

Example B10 provides the phase shift module according to any one of the preceding examples B, further including an ESD protection component, coupled to the second feed line.

Example B11 provides the phase shift module according to example B10, where the ESD protection component is a shunt inductor.

Example B12 provides the phase shift module according to example B10, where the ESD protection component is a quarter wave stub.

Example B13 provides the phase shift module according to any one of the preceding examples B, where at least one (but preferably all) of the plurality of switches is a MEMS-based switch.

Example B14 provides a phase shift module for an antenna apparatus, the phase shift module including a first feed line that splits into a second feed line and a third feed line; a first switch arrangement, coupled to the second feed line; and a second switch arrangement, coupled to the third feed line. In operation, an RF signal transmitted over the first feed line includes a sum of an RF signal transmitted over the second feed line and an RF signal transmitted over the third feed line. The first switch arrangement is configured to selectively couple the second feed line to a fourth feed line at a coupling point at one of a plurality of predefined locations between a first end and a second end of the fourth feed line. The second switch arrangement is configured to selectively couple the third feed line to a fifth feed line at a coupling point at one of a plurality of predefined locations between a first end and a second end of the fifth feed line. Furthermore, in operation, each of the first end of the fourth feed line, the second end of the fourth feed line, the first end of the fifth feed line, and the second end of the fifth feed line is coupled to a different antenna element.

Example B15 provides the phase shift module according to example B14, further including a first input or output (I/O) port, coupled to an end of the first feed line that is opposite to an end of the first feed line where the first feed line splits into the second feed line and the third feed line; and four second I/O ports. A first of the four second I/O ports is configured to couple the first end of the fourth feed line to a first antenna element, a second of the four second I/O ports is configured to couple the second end of the fourth feed line to a second antenna element, a third of the four second I/O ports is configured to couple the first end of the fifth feed line to a third antenna element, and a fourth of the four second I/O ports is configured to couple the second end of the fifth feed line to a fourth antenna element.

Example B16 provides the phase shift module according to example B15, where, in a first mode of operation, the first I/O port is an input port and each of the four second I/O ports is an output port, and, in a second mode of operation, the first I/O port is an output port and each of the four second I/O ports is an input port.

Example B17 provides the phase shift module according to any one of examples B14-B16, where, in operation, the RF signal transmitted over the second feed line is a sum of an RF signal transmitted over a first portion of the fourth feed line and an RF signal transmitted over a second portion of the fourth feed line, where the first portion of the fourth feed line is between the coupling point and the first end of the fourth feed line, and the second portion of the fourth feed line is between the coupling point and the second end of the fourth feed line. Furthermore, in operation, the RF signal transmitted over the third feed line is a sum of an RF signal transmitted over a first portion of the fifth feed line and an RF signal transmitted over a second portion of the fifth feed line, where the first portion of the fifth feed line is between the coupling point and the first end of the fifth feed line, and the second portion of the fifth feed line is between the coupling point and the second end of the fifth feed line. The first switch arrangement is configured so that, in operation, an RF signal transmitted over the first portion of the fourth feed line undergoes a phase shift of a positive first angle and the RF signal transmitted over the second portion of the fourth feed line undergoes a phase shift of a negative first angle. The second switch arrangement is configured so that, in operation, an RF signal transmitted over the first portion of the fifth feed line undergoes a phase shift of a positive second angle and the RF signal transmitted over the second portion of the fifth feed line undergoes a phase shift of a negative second angle.

Example B18 provides the phase shift module according to example B17, where the first angle is substantially equal to a double of the second angle.

Example B19 provides the phase shift module according to examples B17 or B18, where the first switch arrangement is configured so that the first angle is different when the first switch arrangement couples the second feed line to different ones of the plurality of predefined locations between the first end and the second end of the fourth feed line, and the second switch arrangement is configured so that the second angle is different when the second switch arrangement couples the third feed line to different ones of the plurality of predefined locations between the first end and the second end of the fifth feed line.

Example B20 provides the phase shift module according to any one of examples B14-B19, further including one or more of ESD protection components, coupled to one or more of the first feed line, the second feed line, the third feed line, the fourth feed line, and the fifth feed line.

Example B21 provides a phase shift module for an antenna apparatus, the phase shift module including a switch arrangement, configured to selectively couple a first feed line to a second feed line at a coupling point at one of a plurality of predefined locations between a first end and a second end of the second feed line, where, in operation, the first end of the second feed line is coupled to a first antenna element of the antenna apparatus and the second end of the second feed line is coupled to a second antenna element of the antenna apparatus.

Example B22 provides the phase shift module according to example B21, where the coupling point is at a first location of the plurality of predefined locations between the first end and the second end of the second feed line when the switch arrangement is in a first state, and the coupling point is at a second location of the plurality of predefined locations between the first end and the second end of the second feed line when the switch arrangement is in a second state.

Example B23 provides the phase shift module according to examples B21 or B22, where, in operation, an RF signal transmitted over the first feed line is split into a first RF signal transmitted from the coupling point to the first end of the second feed line and a second RF signal transmitted from the coupling point to the second end of the second feed line, the first RF signal is phase shifted with respect to the RF signal by an angle $\theta$, and the second RF signal is phase shifted with respect to the RF signal by an angle $-\theta$.

Example B24 provides the phase shift module according to example B23, where a value of $\theta$ is based on a location of the coupling point between the first end and the second end of the second feed line.

Example B25 provides an antenna apparatus for wirelessly receiving and transmitting RF signals using a plurality of antenna elements of an antenna array, the antenna apparatus comprising a phase shift module according to any one of examples B.

Example B26 provides a method of operating a phase shift module according to any one of examples B.

Variations and Implementations

While embodiments of the present disclosure were described above with references to exemplary implementations as shown in FIGS. 1-17, a person skilled in the art will realize that the various teachings described above are applicable to a large variety of other implementations. For example, the same principles may be applied to radar systems, automotive radar, frequency generation circuits (e.g., phase-locked loop, etc.), and optical networks.

In certain contexts, the features discussed herein can be applicable to automotive systems, medical systems, scientific instrumentation, wireless and wired communications, radio, radar, and digital-processing-based systems.

In the discussions of the embodiments above, components of a system, such as phase shifters, frequency mixers, amplifiers, and/or other components can readily be replaced, substituted, or otherwise modified in order to accommodate particular circuitry needs. Moreover, it should be noted that the use of complementary electronic devices, hardware, software, etc., offer an equally viable option for implementing the teachings of the present disclosure related to phase shifters using switch-based feed line splitters as described herein.

Parts of various systems for implementing phase shifters using switch-based feed line splitters as proposed herein can include electronic circuitry to perform the functions described herein. In some cases, one or more parts of the system can be provided by a processor specially configured for carrying out the functions described herein. For instance, the processor may include one or more application specific components, or may include programmable logic gates which are configured to carry out the functions describe herein. The circuitry can operate in analog domain, digital domain, or in a mixed-signal domain. In some instances, the processor may be configured to carrying out the functions described herein by executing one or more instructions stored on a non-transitory computer-readable storage medium.

In one example embodiment, any number of electrical circuits of the present figures may be implemented on a board of an associated electronic device. The board can be a general circuit board that can hold various components of the internal electronic system of the electronic device and, further, provide connectors for other peripherals. More specifically, the board can provide the electrical connections by which the other components of the system can communicate electrically. Any suitable processors (inclusive of DSPs, microprocessors, supporting chipsets, etc.), computer-readable non-transitory memory elements, etc. can be suitably coupled to the board based on particular configuration needs, processing demands, computer designs, etc. Other components such as external storage, additional sensors, controllers for audio/video display, and peripheral devices may be attached to the board as plug-in cards, via cables, or integrated into the board itself. In various embodiments, the functionalities described herein may be implemented in emulation form as software or firmware running within one or more configurable (e.g., programmable) elements arranged in a structure that supports these functions. The software or firmware providing the emulation may be provided on non-transitory computer-readable storage medium comprising instructions to allow a processor to carry out those functionalities.

In another example embodiment, the electrical circuits of the present figures may be implemented as stand-alone modules (e.g., a device with associated components and circuitry configured to perform a specific application or function) or implemented as plug-in modules into application specific hardware of electronic devices. Note that particular embodiments of the present disclosure may be readily included in a system on chip (SOC) package, either in part, or in whole. An SOC represents an IC that integrates components of a computer or other electronic system into a single chip. It may contain digital, analog, mixed-signal, and often RF functions: all of which may be provided on a single chip substrate. Other embodiments may include a multi-chip-module (MCM), with a plurality of separate ICs located within a single electronic package and configured to interact closely with each other through the electronic package. In various other embodiments, the electrical circuits described herein may be implemented in one or more silicon cores in Application Specific Integrated Circuits (ASICs), Field Programmable Gate Arrays (FPGAs), and other semiconductor chips.

It is also imperative to note that all of the specifications, dimensions, and relationships outlined herein (e.g., the number of components shown in the systems of FIGS. 1-17) have only been offered for purposes of example and teaching only. Such information may be varied considerably without departing from the spirit of the present disclosure, or the scope of the appended claims. It should be appreciated that the system can be consolidated in any suitable manner. Along similar design alternatives, any of the illustrated circuits, components, modules, and elements of the present figures may be combined in various possible configurations, all of which are clearly within the broad scope of this specification. In the foregoing description, example embodiments have been described with reference to particular processor and/or component arrangements. Various modifications and changes may be made to such embodiments without departing from the scope of the appended claims. The description and drawings are, accordingly, to be regarded in an illustrative rather than in a restrictive sense.

It is also important to note that the functions related to realizing phase shifters using switch-based feed line splitters as proposed herein illustrate only some of the possible functions that may be executed by, or within, RF systems. Some of these operations may be deleted or removed where appropriate, or these operations may be modified or changed considerably without departing from the scope of the present disclosure. Substantial flexibility is provided by embodiments described herein in that any suitable arrangements, chronologies, configurations, and timing mechanisms may be provided without departing from the teachings of the present disclosure.

The invention claimed is:

1. A phase shift module for an antenna apparatus, the phase shift module comprising:
a switch arrangement, configured to couple a first feed line to a coupling point that is between two opposite ends of a second feed line so that a power of a radio frequency (RF) signal transmitted over the first feed line includes a sum of a power of an RF signal transmitted over a first portion of the second feed line and a power of an RF signal transmitted over a second portion of the second feed line, where the first portion is a portion of the second feed line between the coupling point and a first antenna element coupled to a first end of the two opposite ends of the second feed line, and the second portion is a portion of the second feed line between the coupling point and a second antenna element coupled to a second end of the two opposite ends of the second feed line,
the switch arrangement comprising a plurality of switches and configured to be in one of a plurality of states depending on a state of each switch of the plurality of switches,
where the coupling point is at a first location of a plurality of locations between the two opposite ends of the second feed line when the switch arrangement is in a first state of the plurality of states, and the coupling point is at a second location of the plurality of locations when the switch arrangement is in a second state of the plurality of states.

2. The phase shift module according to claim 1, wherein:
the each switch is configured to be either in a first state or in a second state,
the each switch is coupled between the first feed line and a different location of the plurality of locations between the two opposite ends of the second feed line, and
in each of the plurality of states of the switch arrangement, only one of the plurality of switches is in the first state.

3. The phase shift module according to claim 1, wherein:
for each of the plurality of locations of the coupling point, the RF signal transmitted over the first portion of the second feed line undergoes a phase shift of an angle θ and the RF signal transmitted over the second portion of the second feed line undergoes a phase shift of an angle −θ, and a value of the angle θ is different for different locations of the coupling point.

4. The phase shift module according to claim 3, wherein:
the plurality of locations of the coupling point include a first location, a second location, a third location, and a fourth location,
the value of the angle θ is 0 degrees when the coupling point is at the first location,
the value of the angle θ is 45 degrees when the coupling point is at the second location,
the value of the angle θ is 90 degrees when the coupling point is at the third location, and
the value of the angle θ is 135 degrees when the coupling point is at the fourth location.

5. The phase shift module according to claim 1, wherein:
the first feed line includes a first portion and a second portion, the second portion being a portion of the first feed line that is closest to and coupled to the coupling point, and the second portion being coupled to the first portion,
the second portion of the first feed line includes an impedance transformer configured to transform an impedance of the first feed line from being at a first value at the first portion of the first feed line to being at a second value at the second portion of the first feed line.

6. The phase shift module according to claim 5, wherein the second value is substantially equal to 50/√2 Ohm.

7. The phase shift module according to claim 5, wherein a length of the second portion of the first feed line is substantially equal to a quarter of a wavelength of the RF signal transmitted over the first feed line.

8. The phase shift module according to claim 1, wherein an impedance of the second feed line is substantially equal to 50 Ohm.

9. The phase shift module according to claim 1, further comprising an electrostatic discharge (ESD) protection component, coupled to the second feed line.

10. A phase shift module for an antenna apparatus, the phase shift module comprising:
a first feed line that splits into a second feed line and a third feed line;
a first switch arrangement, coupled to the second feed line; and
a second switch arrangement, coupled to the third feed line,
wherein:
in operation, a radio frequency (RF) signal transmitted over the first feed line includes a sum of an RF signal transmitted over the second feed line and an RF signal transmitted over the third feed line,
the first switch arrangement is configured to selectively couple the second feed line to a fourth feed line at a coupling point at one of a plurality of predefined locations between a first end and a second end of the fourth feed line,
the second switch arrangement is configured to selectively couple the third feed line to a fifth feed line at a coupling point at one of a plurality of predefined locations between a first end and a second end of the fifth feed line, and
in operation, each of the first end of the fourth feed line, the second end of the fourth feed line, the first end of the fifth feed line, and the second end of the fifth feed line is coupled to a different antenna element.

11. The phase shift module according to claim 10, further comprising:
- a first input or output (I/O) port, coupled to an end of the first feed line that is opposite to an end of the first feed line where the first feed line splits into the second feed line and the third feed line; and
- four second I/O ports, where:
  - a first of the four second I/O ports is configured to couple the first end of the fourth feed line to a first antenna element,
  - a second of the four second I/O ports is configured to couple the second end of the fourth feed line to a second antenna element,
  - a third of the four second I/O ports is configured to couple the first end of the fifth feed line to a third antenna element, and
  - a fourth of the four second I/O ports is configured to couple the second end of the fifth feed line to a fourth antenna element.

12. The phase shift module according to claim 11, wherein:
- in a first mode of operation, the first I/O port is an input port and each of the four second I/O ports is an output port, and
- in a second mode of operation, the first I/O port is an output port and each of the four second I/O ports is an input port.

13. The phase shift module according to claim 10, wherein:
- in operation, the RF signal transmitted over the second feed line is a sum of an RF signal transmitted over a first portion of the fourth feed line and an RF signal transmitted over a second portion of the fourth feed line, where the first portion of the fourth feed line is between the coupling point and the first end of the fourth feed line, and the second portion of the fourth feed line is between the coupling point and the second end of the fourth feed line,
- in operation, the RF signal transmitted over the third feed line is a sum of an RF signal transmitted over a first portion of the fifth feed line and an RF signal transmitted over a second portion of the fifth feed line, where the first portion of the fifth feed line is between the coupling point and the first end of the fifth feed line, and the second portion of the fifth feed line is between the coupling point and the second end of the fifth feed line,
- the first switch arrangement is configured so that, in operation, an RF signal transmitted over the first portion of the fourth feed line undergoes a phase shift of a positive first angle and the RF signal transmitted over the second portion of the fourth feed line undergoes a phase shift of a negative first angle, and
- the second switch arrangement is configured so that, in operation, an RF signal transmitted over the first portion of the fifth feed line undergoes a phase shift of a positive second angle and the RF signal transmitted over the second portion of the fifth feed line undergoes a phase shift of a negative second angle.

14. The phase shift module according to claim 13, wherein the first angle is substantially equal to a double of the second angle.

15. The phase shift module according to claim 13, wherein:
- the first switch arrangement is configured so that the first angle is different when the first switch arrangement couples the second feed line to different ones of the plurality of predefined locations between the first end and the second end of the fourth feed line, and
- the second switch arrangement is configured so that the second angle is different when the second switch arrangement couples the third feed line to different ones of the plurality of predefined locations between the first end and the second end of the fifth feed line.

16. The phase shift module according to claim 10, further comprising one or more of electrostatic discharge (ESD) protection components, coupled to one or more of the first feed line, the second feed line, the third feed line, the fourth feed line, and the fifth feed line.

17. A phase shift module for an antenna apparatus, the phase shift module comprising:
- a switch arrangement, configured to selectively couple a first feed line to a second feed line at a coupling point at one of a plurality of predefined locations between a first end and a second end of the second feed line,
- where, in operation, the first end of the second feed line is coupled to a first antenna element of the antenna apparatus and the second end of the second feed line is coupled to a second antenna element of the antenna apparatus.

18. The phase shift module according to claim 17, wherein:
- the coupling point is at a first location of the plurality of predefined locations between the first end and the second end of the second feed line when the switch arrangement is in a first state, and
- the coupling point is at a second location of the plurality of predefined locations between the first end and the second end of the second feed line when the switch arrangement is in a second state.

19. The phase shift module according to claim 17, wherein:
- in operation, a radio frequency (RF) signal transmitted over the first feed line is split into a first RF signal transmitted from the coupling point to the first end of the second feed line and a second RF signal transmitted from the coupling point to the second end of the second feed line,
- the first RF signal is phase shifted with respect to the RF signal by an angle $\theta$, and
- the second RF signal is phase shifted with respect to the RF signal by an angle $-\theta$.

20. The phase shift module according to claim 19, wherein a value of $\theta$ is based on a location of the coupling point between the first end and the second end of the second feed line.

* * * * *